(12) United States Patent
Nakamura

(10) Patent No.: US 7,314,320 B2
(45) Date of Patent: Jan. 1, 2008

(54) EXTENDABLE PIVOT SHAFT MECHANISM, AND AN EXTENDABLE PIVOT SHAFT MECHANISM OF A CAMERA FOR PIVOTING A ROTATABLE GRIP TO A CAMERA BODY

(75) Inventor: Yoshikazu Nakamura, Saitama (JP)

(73) Assignee: PENTAX Corporation, Tokyo (JP)

( * ) Notice: Subject to any disclaimer, the term of this patent is extended or adjusted under 35 U.S.C. 154(b) by 409 days.

(21) Appl. No.: 11/121,074

(22) Filed: May 4, 2005

(65) Prior Publication Data
US 2005/0253960 A1    Nov. 17, 2005

(30) Foreign Application Priority Data
May 12, 2004   (JP)   ............... 2004-142892

(51) Int. Cl.
G03B 17/00    (2006.01)
G03B 17/02    (2006.01)

(52) U.S. Cl. .................... 396/420; 396/535
(58) Field of Classification Search ........ 396/419, 396/420, 428, 535; 348/375–376
See application file for complete search history.

(56) References Cited

U.S. PATENT DOCUMENTS

| | | | |
|---|---|---|---|
| 5,442,453 A | 8/1995 | Takagi et al. | |
| 5,784,206 A | 7/1998 | Nomura et al. | |
| 2006/0051083 A1* | 3/2006 | Yamamoto | 396/287 |
| 2007/0053680 A1* | 3/2007 | Fromm | 396/420 |
| 2007/0140686 A1* | 6/2007 | Misawa | 396/535 |

OTHER PUBLICATIONS

U.S. Appl. No. 11/121,062 to Nakamura, filed May 4, 2005.
U.S. Appl. No. 11/121,095 to Nakamura et al., filed May 4, 2005.
U.S. Appl. No. 11/052,798 to Nakamura, filed Feb. 9, 2005.

* cited by examiner

Primary Examiner—Christopher Mahoney
(74) Attorney, Agent, or Firm—Greenblum & Bernstein, P.L.C.

(57) ABSTRACT

An extendable pivot shaft mechanism of a camera includes two concentric cylindrical members fixed to a camera body and a rotatable grip, respectively; an advancing/retreating lock control member supported by one of the concentric cylindrical members and linearly movable along a rotational axis without rotating relative thereto, the advancing/retreating lock control member being operated from outside the camera body or the grip; a rotation locking mechanism for changing a state of the advancing/retreating lock control member and the other of the two concentric cylindrical members between a rotation locked state and a rotation unlocked state in accordance with a linear movement of the advancing/retreating lock control member relative to the one of the concentric cylindrical members; and a lock biasing device for biasing the advancing/retreating lock control member in a rotation locking direction to cause the rotation locking mechanism to change to the rotation locked state.

23 Claims, 30 Drawing Sheets

EXTENDABLE PIVOT SHAFT MECHANISM, AND AN EXTENDABLE PIVOT SHAFT MECHANISM OF A CAMERA FOR PIVOTING A ROTATABLE GRIP TO A CAMERA BODY

BACKGROUND OF THE INVENTION

1. Field of the Invention

The present invention relates to an extendable pivot shaft mechanism of a camera for pivoting a rotatable grip to a camera body, and also relates to an extendable pivot shaft mechanism incorporated in various apparatuses including a camera.

2. Description of the Related Art

A conventional mechanism (extendable pivot shaft mechanism) for connecting two devices with each other to allow the two devices both to rotate about a rotational axis relative to each other and to move along the rotational axis relative to each other is difficult to be made to operate smoothly without increasing the size of the mechanism. For instance, the assignee of the present invention has found that providing a camera body with a rotatable grip capable of both rotating about a rotational axis and moving along the rotational axis relative to the camera body via the extendable pivot shaft mechanism improves the operability of the camera. Specifically, in such a rotatable grip of a precision apparatus such as a camera, a higher level of smoothness in operation of the rotatable grip when manually moved relative to the camera body and a high level of stability of the rotatable grip in an operating state thereof (the prevention of unintentional movement of the rotatable grip) is required.

SUMMARY OF THE INVENTION

The present invention provides an extendable pivot shaft mechanism of a camera for pivoting a rotatable grip on a camera body so that the rotatable grip can both rotate about a rotational axis and move along the rotational axis relative to the camera body, wherein the smoothness in movement of the rotatable grip when manually moved relative to the camera body, the stability of the rotatable grip in an operating state thereof and miniaturization of the extendable pivot shaft mechanism are all achieved at a high level. The present invention further provides an extendable pivot shaft mechanism for connecting two devices with each other to allow the two devices both to rotate about a rotational axis relative to each other and to move along the rotational axis relative to each other, wherein the smoothness in operation of the two devices when the two devices rotate and move relative to each other, the stability of the two devices upon a stoppage of such relative movement, and miniaturization of the extendable pivot shaft mechanism are all achieved at a high level.

According to an aspect of the present invention, an extendable pivot shaft mechanism of a camera is provided, for pivoting a rotatable grip on a camera body to allow the rotatable grip both to rotate about a rotational axis and to move along the rotational axis relative to the camera body, the extendable pivot shaft mechanism including first and second cylindrical members which are concentrically arranged and are fixed to the camera body and the rotatable grip, respectively; an advancing/retreating lock control member which is supported by the first cylindrical member to be linearly movable along the rotational axis without rotating relative thereto, wherein the advancing/retreating lock control member is operated from outside one of the camera body and the grip; a rotation locking mechanism for changing a state of the advancing/retreating lock control member and the second cylindrical member between a rotation locked state, in which the advancing/retreating lock control member and the second cylindrical member are prevented from rotating relative to each other, and a rotation unlocked state, in which the advancing/retreating lock control member and the second cylindrical members are allowed to rotate relative to each other, in accordance with a linear movement of the advancing/retreating lock control member relative to the first cylindrical member; and a lock biasing device for biasing the advancing/retreating lock control member in a rotation locking direction to cause the rotation locking mechanism to change to the rotation locked state.

It is desirable for the first and second cylindrical members to include an outside cylinder fixed to the camera body, and an inside cylinder fixed to the rotatable grip and positioned inside the outside cylinder. The advancing/retreating lock control member is positioned inside the inside cylinder to be supported thereby.

It is desirable for the advancing/retreating lock control member to be supported so as to linearly move along the rotational axis without rotating relative to the outside cylinder and so as to both linearly move along the rotational axis and rotate relative to the inside cylinder.

It is desirable for the rotation locking mechanism to include a rotation preventing plate which faces an end surface of the inside cylinder and moves linearly along the rotational axis together with the advancing/retreating lock control member to move toward and away from the end surface of the inside cylinder; and at least one projection and at least one recess which are provided on an end surface of the rotation preventing plate and the end surface of the inside cylinder, respectively, which are opposed to each other in the rotational axis direction to be engageable with each other, the projection being engaged in the recess when the end surfaces of the rotation preventing plate and the inside cylinder move close to each other to prevent the rotation preventing plate and the inside cylinder from rotating relative to each other, and the projection being disengaged from the recess when the end surfaces of the rotation preventing plate and the inside cylinder move away from each other to allow the rotation preventing plate and the inside cylinder to rotate relative to each other.

It is desirable for the recess to include a plurality of recesses formed on the end surface of the inside cylinder in a circumferential direction about the rotational axis.

It is desirable for the plurality of recesses to be provided at substantially equi-angular intervals about the rotational axis.

It is desirable for the outside cylinder to include at least one linear guide groove formed on an inner peripheral surface of the outside cylinder so as to extend in a direction parallel to the rotational axis, and for the rotation preventing plate to include at least one linear guide projection which is slidably engaged in the linear guide groove.

It is desirable for the linear guide groove to be a pair of linear guide grooves which are radially opposed to each other, and for the linear guide projection to include a pair of linear guide projections which are slidably engaged in the pair of linear guide grooves, respectively.

It is desirable for the rotation preventing plate to be coupled to the advancing/retreating lock control member to be prevented from rotating about the rotational axis relative to the advancing/retreating lock control member.

It is desirable for the lock biasing device to bias the rotation preventing plate in a direction to move the end surface of the rotation preventing plate toward the end surface of the inside cylinder.

It is desirable for the lock biasing device to include a coil spring positioned in an annular space between the inside cylinder and the advancing/retreating lock control member, and for the inside cylinder and the advancing/retreating lock control member to include a first spring contacting portion and a second contacting portion with which one and the other end of the coil spring are in pressing contact, respectively.

The extendable pivot shaft mechanism can include an unlocking manual operation member which is positioned in a through-hole, formed on an external wall of the grip to extend therethrough, to be movable along an axis of the through-hole, wherein the unlocking manual operation member pushes the advancing/retreating lock control member in a rotation unlocking direction opposed to the rotation locking direction against the biasing force of the lock biasing device to cause the rotation locking mechanism to change to the rotation unlocked state when the unlocking manual operation member is operated.

It is desirable for the unlocking manual operation member to be pressed into the grip when the unlocking manual operation member is operated.

It is desirable for the unlocking manual operation member to be coaxial with the advancing/retreating lock control member.

It is desirable for the extendable pivot shaft mechanism to include a second rotation locking mechanism for preventing the first and second cylindrical members from rotating relative to each other independently of the rotation locking mechanism when the grip is in a first position close to the camera body in the rotation axis direction, and for allowing the first and second cylindrical members to rotate relative to each other when the grip is in a second position jutted from the camera body in the rotation axis direction.

It is desirable for the second rotation locking mechanism to include at least one axial groove formed on one of radially opposed peripheral surfaces of the first and second cylindrical members to extend in a direction substantially parallel to the rotational axis; at least one circumferential groove formed on the one of radially opposed peripheral surfaces of the first and second cylindrical members to be communicatively connected with the axial groove; and at least one guide projection which projects from the other of the radially opposed peripheral surfaces of the first and second cylindrical members to be slidably selectively engaged in the axial groove and the circumferential groove.

It is desirable for the circumferential groove to include a stop surface which limits a range of movement of the guide projection to limit a range of rotation of the grip relative to the camera body.

It is desirable for the circumferential groove to be communicatively connected with one end of the axial groove in the rotational axis direction, and for the stop surface to be formed on the one end of the axial groove.

It is desirable for the extendable pivot shaft mechanism to include a click-stop mechanism, provided between radially opposed peripheral surfaces of the first and second cylindrical members, for selectively stopping the grip moving along the rotational axis at a first position close to the camera body and a second position away from the camera body with a click action, and for selectively stopping the grip rotating about the rotational axis at different rotational positions relative to the camera body with a click action.

It is desirable for the advancing/retreating lock control member to be positioned radially inside the first and second cylindrical members to be concentric with the first and second cylindrical members.

It is desirable for the rotatable grip to be a shutter release button.

It is desirable for the rotational axis to extend in a direction orthogonal to an optical axis of a photographing optical system of the camera.

In an embodiment, an extendable pivot shaft mechanism is provided, for connecting two devices with each other to allow the two devices both to rotate relative to each other about a rotational axis and to move relative to each other along the rotational axis, the extendable pivot shaft mechanism including first and second cylindrical members which are concentrically arranged and are fixed to the two devices, respectively; an advancing/retreating lock control member which is supported by the first cylindrical member to be linearly movable along the rotational axis without rotating relative thereto, wherein the advancing/retreating lock control member is operated from outside one of the two devices; a rotation locking mechanism for changing a state of the advancing/retreating lock control member and the second cylindrical member between a rotation locked state, in which the advancing/retreating lock control member and the second cylindrical member are prevented from rotating relative to each other, and a rotation unlocked state, in which the advancing/retreating lock control member and the second cylindrical members are allowed to rotate relative to each other, in accordance with a linear movement of the advancing/retreating lock control member relative to the first cylindrical member; and a lock biasing device for biasing the advancing/retreating lock control member in a rotation locking direction to cause the rotation locking mechanism to change to the rotation locked state.

The present disclosure relates to subject matter contained in Japanese Patent Application Ser. No. 2004-142892 (filed on May 12, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
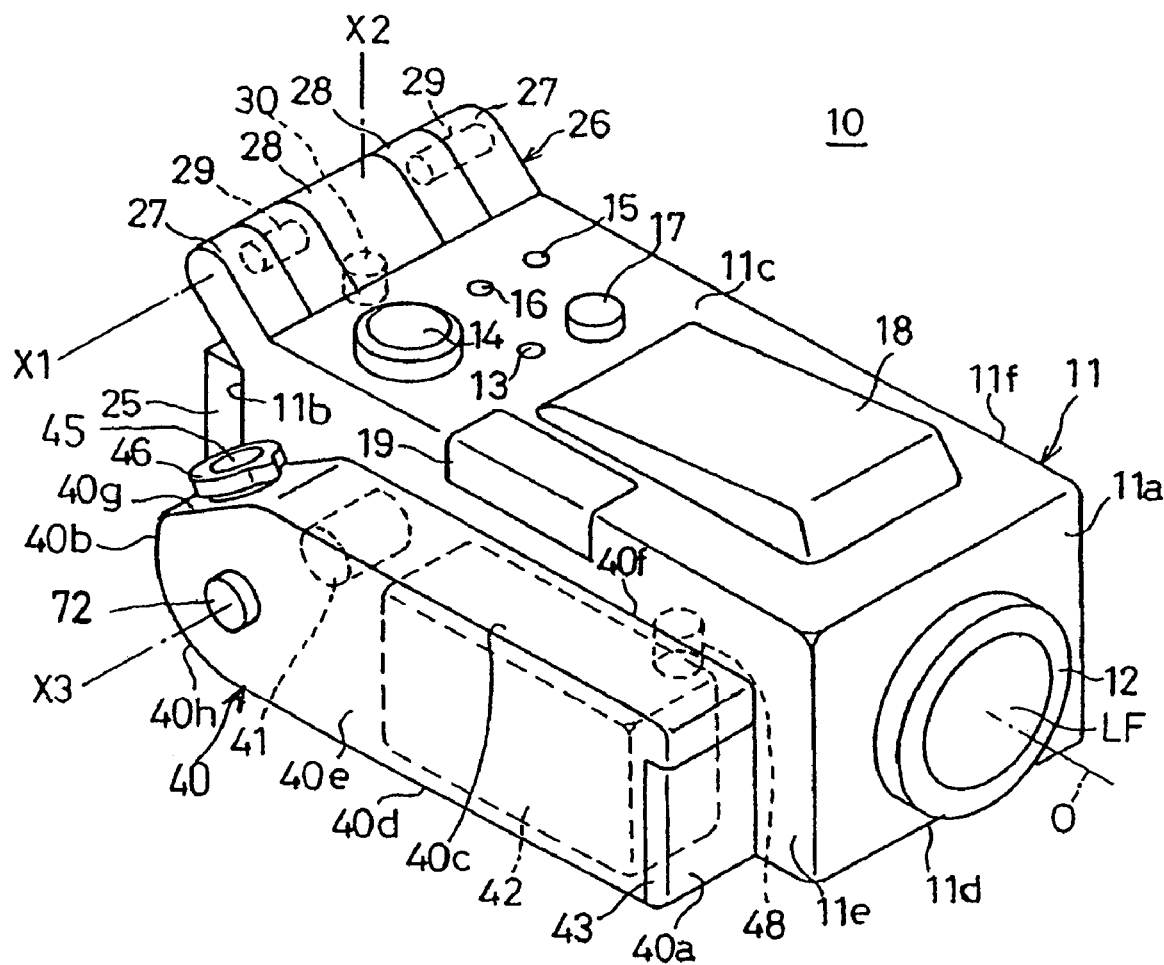
FIG. 1 is a perspective view of an embodiment of a digital camera having an extendable pivot shaft mechanism according to the present invention.
Figure 2:
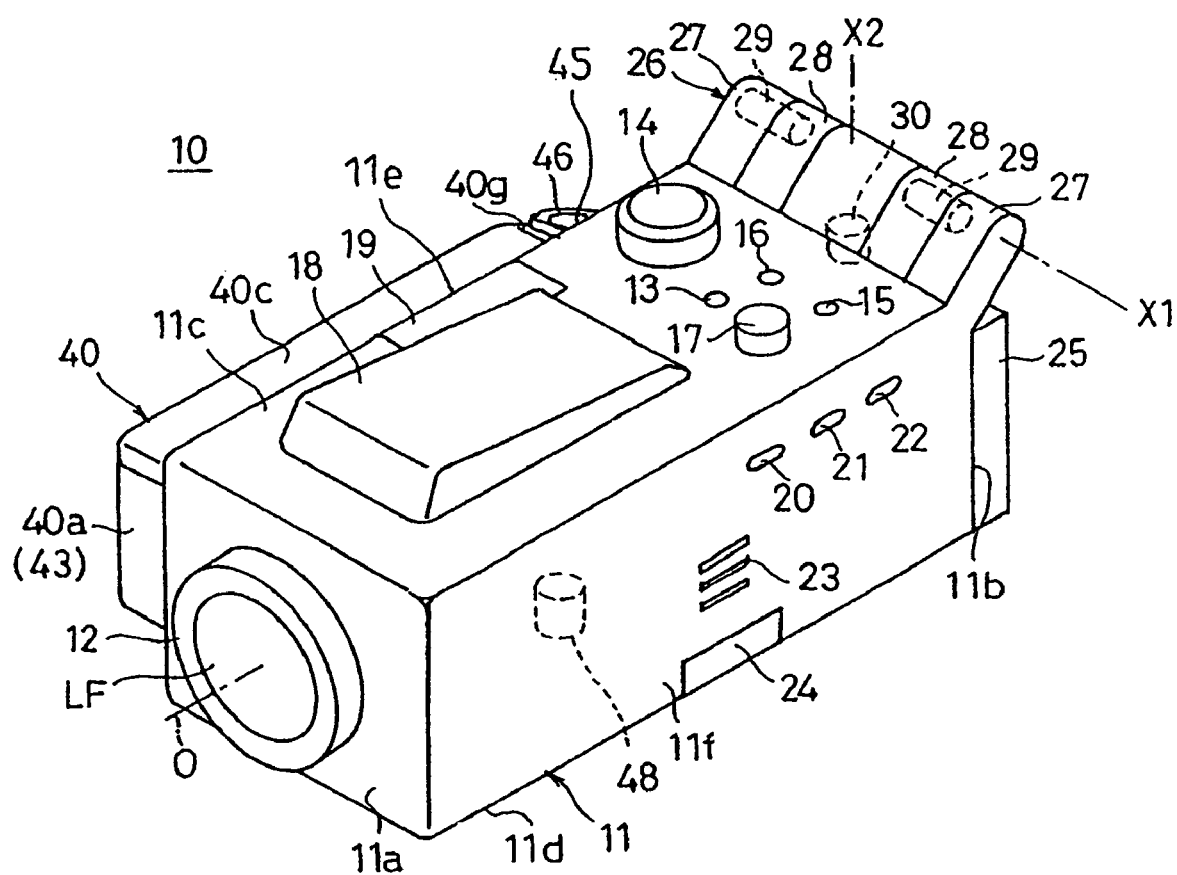
FIG. 2 is a perspective view of the digital camera shown in FIG. 1, viewed from a different angle.
Figure 3:
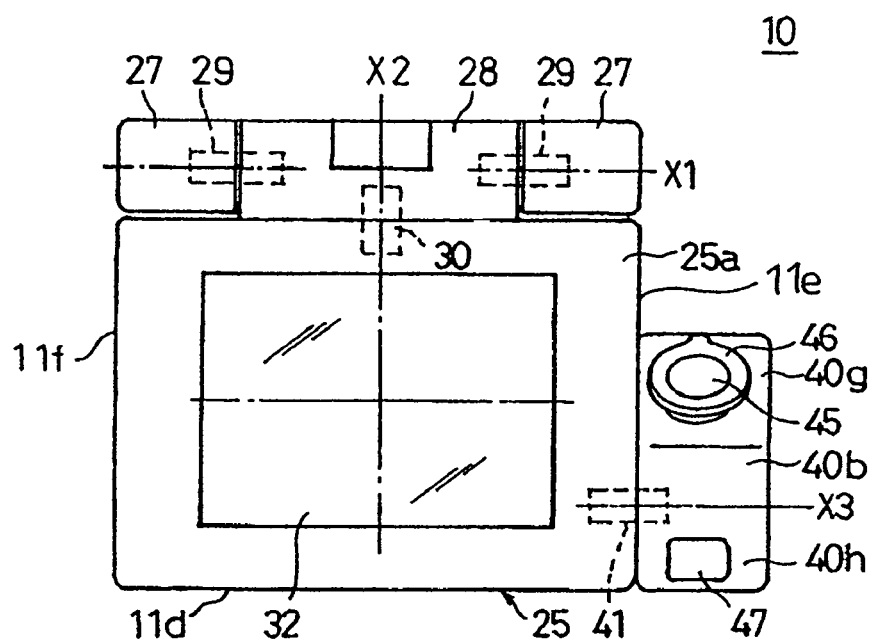
FIG. 3 is a rear elevational view of the digital camera shown in FIGS. 1 and 2.

FIGS. 1 through 12 show an embodiment of a digital camera having a pivot shaft mechanism according to the present invention. The digital camera 10 is provided with a camera body 11 including a photographing optical system. The camera body 11 is formed as a substantially rectangular parallelepiped which is elongated along an optical axis O of the photographing optical system. The outer surface of the camera body 11 is composed of six surfaces: a front end surface 11a, a rear end surface 11b, a top surface 11c, a bottom surface 11d, a right side surface 11e, and a left side surface 11f. The top surface 11c, the bottom surface 11d, the right side surface 11e, and the left side surface 11f connect the front end surface 11a with the rear end surface 11b, and surround the optical axis O. In the present embodiment of the digital camera, the vertical direction and the horizontal direction of FIGS. 3, 11 and 12 correspond to the vertical direction and the horizontal direction of the digital camera 10, respectively. More specifically, the right-hand side of the digital camera 10 with respect to the rear side thereof (as viewed from the right-hand side shown in FIG. 3) is: defined as the right-hand side of the digital camera 10, while the left-hand side of the digital camera 10 with respect to the rear side thereof is defined as the left-hand side of the digital camera 10. In addition, a direction parallel to the optical axis O is defined as a forward/rearward direction of the digital camera 10, the front end surface 11a is defined as the front side of the digital camera 10, and the rear end surface 11b is defined as the rear side of the digital camera 10.

Figure 14:
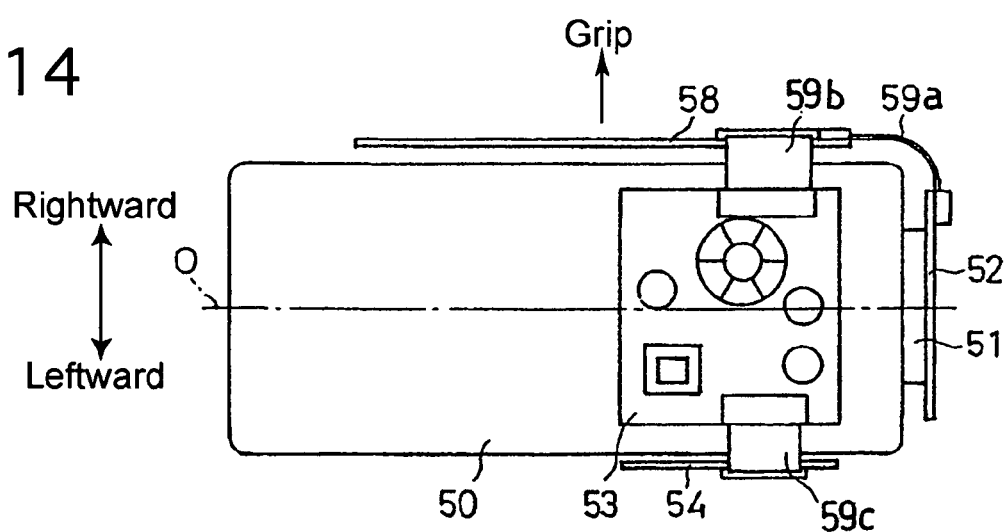
FIG. 14 is a plan view of the internal elements shown in FIG. 13.
Figure 15:
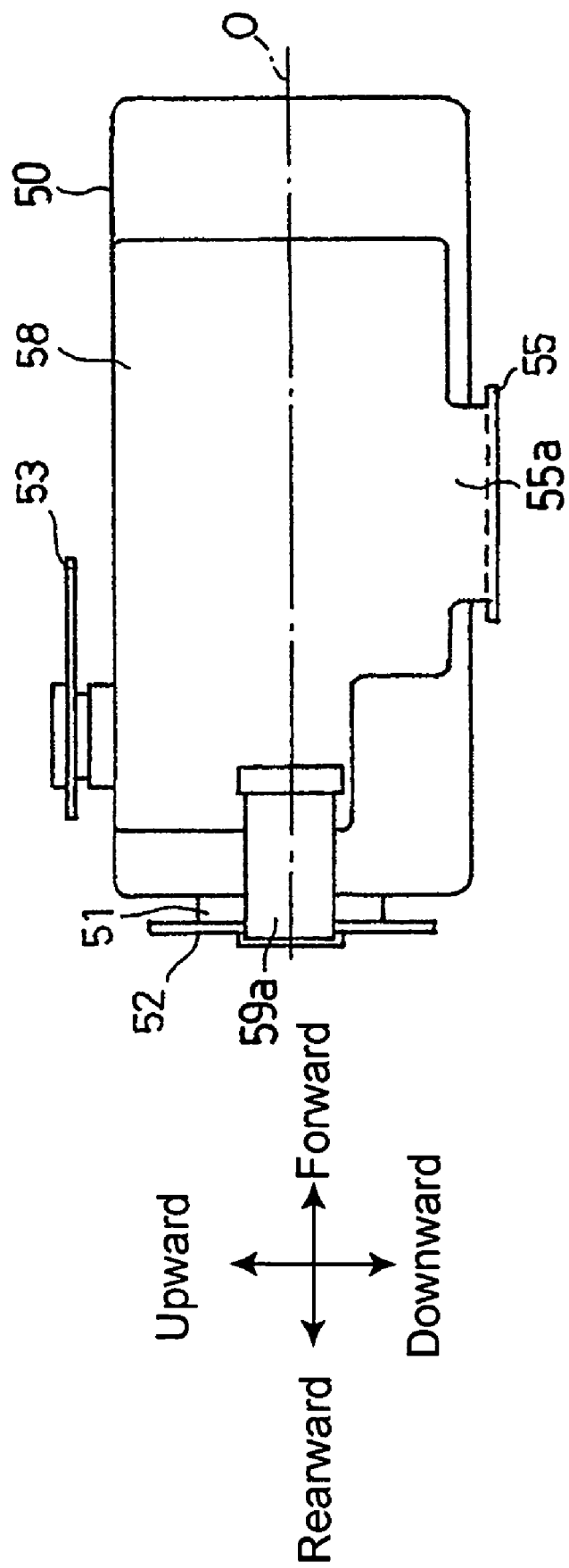
FIG. 15 is a side elevational view of the internal elements shown in FIG. 13.
Figure 16:
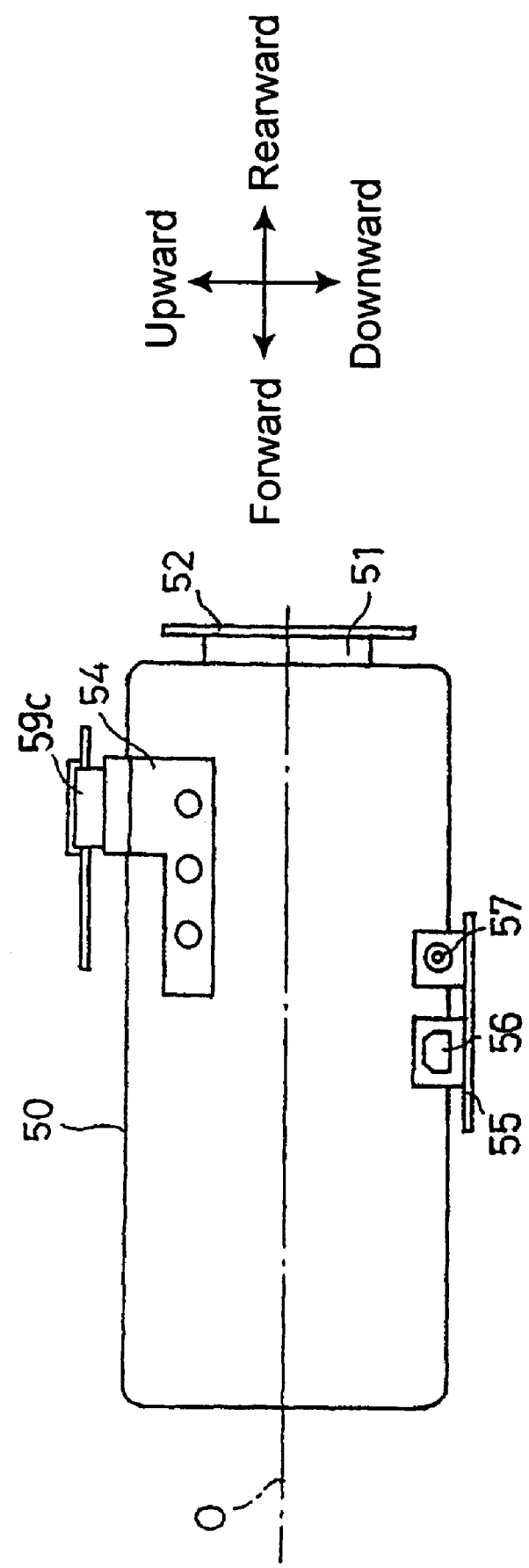
FIG. 16 is a side elevational view of the internal elements shown in FIG. 13, viewed from the side opposite to the side shown in FIG. 15.

The digital camera 10 is provided in the camera body 11 with a frontmost lens group LF of the photographing optical system which is exposed to the outside of the camera body 10 from the front end surface 11a. The frontmost lens group LF can be a lens group consisting of a single lens element or a plurality of lens elements (see FIGS. 14 through 16). The camera body 11 is provided, on the front end surface 11a around the frontmost lens group LF, with a filter mounting screw 12 by which an accessory such as a filter can be attached to the front of the frontmost lens group LF. The photographing optical system of the digital camera 10, that is provided inside the camera body 11, is a zoom lens optical system having more than one lens group in addition to the frontmost lens group LF. Specifically, the photographing optical system is an internal-focusing/zooming optical system in which the focus or the focal length is altered by moving elements internally within the lens barrel (i.e., the external lens barrel is not extended or retracted). Accordingly, the frontmost lens group LF does not move forward from the position thereof shown in the drawings.

The digital camera 10 is provided, on the top surface 11c of the camera body 11 in an area thereon close to the rear end surface 11b, with a mode select dial 14 and various manual operational buttons such as a power button 13, a playback button 15, a menu button 16 and a multi-direction button 17. The power button 13 serves as a manual operational member for turning ON and OFF a main switch of the digital camera 10. The mode select dial 14 serves as a manual operational member for selecting a desired photographing mode from among different photographing modes. The playback button 15 serves as a manual operational member for reproducing stored images on a liquid crystal display (LCD) portion 32. Upon an operation of the menu button 16, the digital camera 10 enters a setting changing mode in which various settings on the digital camera 10 can be changed and set by operating the multi-direction button 17. The multi-direction button 17 is also used to switch playback images to be displayed on the LCD portion 32. Various settings which can be changed by operating the menu button 16 include the settings of storing image size, image quality, white balance and sensitivity, but are not limited solely to theses specific settings. The multi-direction button 17 is made of a momentary switch which can be operated to move in different directions. For instance, the multi-direction button 17 can be operated in biaxial directions orthogonal to each other (four directions: forward, rearward, right and left), and also in a press-down direction at an intersection of the aforementioned biaxial directions, i.e., at the center thereof. The digital camera 10 is provided, on top of the camera body 11, in front of the various manual operational buttons, with a pop-up flash 18. The pop-up flash 18 can be switched between a pop-up position in which a light emitting portion of the pop-up flash 18 projects upwards from the top surface 11c of the camera body 11, and a retracted position in which the light emitting portion of the pop-up flash 18 is retracted into the top surface 11c of the camera body 11. In each of FIGS. 1 through 12, the pop-up flash 18 is in the retracted position, and accordingly, the light emitting portion of the pop-up flash 18 is not shown. The camera body 11 is provided in the vicinity of the ridge (border) between the upper surface 11c and the right side surface 11e with a card slot lid 19 for covering a card slot (not shown) formed on the camera body 11. This card slot is accessible from the outside of the camera body 11 by opening the card slot lid 19. In a state in which the card slot lid 19 is open, a memory card in which image data are stored can be inserted and removed into and from the memory card slot.

The digital camera 10 is provided, on the left side surface 11f of the camera body 11 at regular intervals in the optical axis direction, with a flash mode select button 20, a drive mode select button 21 and a focus mode select button 22. The flash mode select button 20, the drive mode select button 21 and the focus mode select button 22 are positioned in substantially the same range, in the optical axis direction, as the aforementioned various manual operational members (13 through 17) in the optical axis direction. The flash mode select button 20 serves as a manual operational member for controlling the operation of the light emitting portion of the pop-up flash 18. By operating the flash mode select button 20, a desired flash mode can be selected from among different flash modes such as auto flash mode, compulsory flash mode, suppressed flash mode and red-eye reduction mode. The drive mode select button 21 serves as a manual operational button for selecting a drive mode at a shutter release from among different drive modes such as normal drive mode (single-frame mode), multi-frame consecutive photographing mode, self-timer photographing mode and auto-bracketing photographing mode. The focus mode select button 22 serves as a manual operational member for selecting a focus mode from among different focus modes such as normal auto focus mode, macro (close-up) photographing mode, infinity photographing mode and manual focus mode. The digital camera 10 is provided, on the left side surface 11f of the camera body 11 slightly in front of the flash select button 20, with speaker slits 23, and is further provided, on the camera body 11 below the speaker slits 23, with an external connector cover 24. The external connector cover 24 can be opened and closed (or detached and attached) with respect to the left side surface 11f of the camera body 11.

The digital camera 10 is provided at the back of the camera body 11 (on the rear end surface 11b) with an LCD monitor unit 25 which is mounted to the camera body 11 via a hinge portion 26 formed along the ridge (border) between the rear end surface 11b and the top surface 11c. The hinge portion 26 includes a pair of support arms 27, a middle support arm 28 and a pair of pivot pins 29. The pair of support arms 27 project from the camera body 11 at positions thereon laterally apart from each other. The middle support arm 28 to which the LCD monitor unit 25 is fixed to be supported thereby is held between the pair of support arms 27. The pair of pivot pins 29 project in opposite lateral directions away from each other from opposite ends of the middle support arm 28 to be respectively inserted into pin holes of the pair of support arms 27. Due to this structure of the hinge portion 26, the pair of support arms 27 and the middle support arm 28 can rotate relative to each other about the pair of pivot pins 29. An axis X1 of the pair of pivot pins 29 extends in a lateral direction of the digital camera 10 that is orthogonal to the optical axis O. The LCD monitor unit 25 can be manually rotated about the axis X1 between a retracted position (seated position; the position shown in FIGS. 4 and 9) in which the LCD monitor unit 25 is positioned on the rear end surface 11b to sit on the optical axis O, and a maximum rotated position (the position shown by two-dot chain lines in FIG. 8) in which the LCD monitor unit 25 is fully rotated forward (clockwise as viewed in FIG. 8) about the pair of pivot pins 29 so that an edge of the LCD monitor unit 25 which is on the opposite side of the LCD monitor unit 25 from the middle support arm 28 is positioned above the hinge portion 26. When in the retracted position, the LCD monitor unit 25 lies in a plane substantially orthogonal to the optical axis O. It is desirable that the range of rotation of the LCD monitor unit 25 between the retracted position and the maximum rotated position be equal to or greater than 180 degrees. In the present embodiment of the digital camera, the range of rotation of the LCD monitor unit 25 is set at about 210 degrees.

Figure 10:
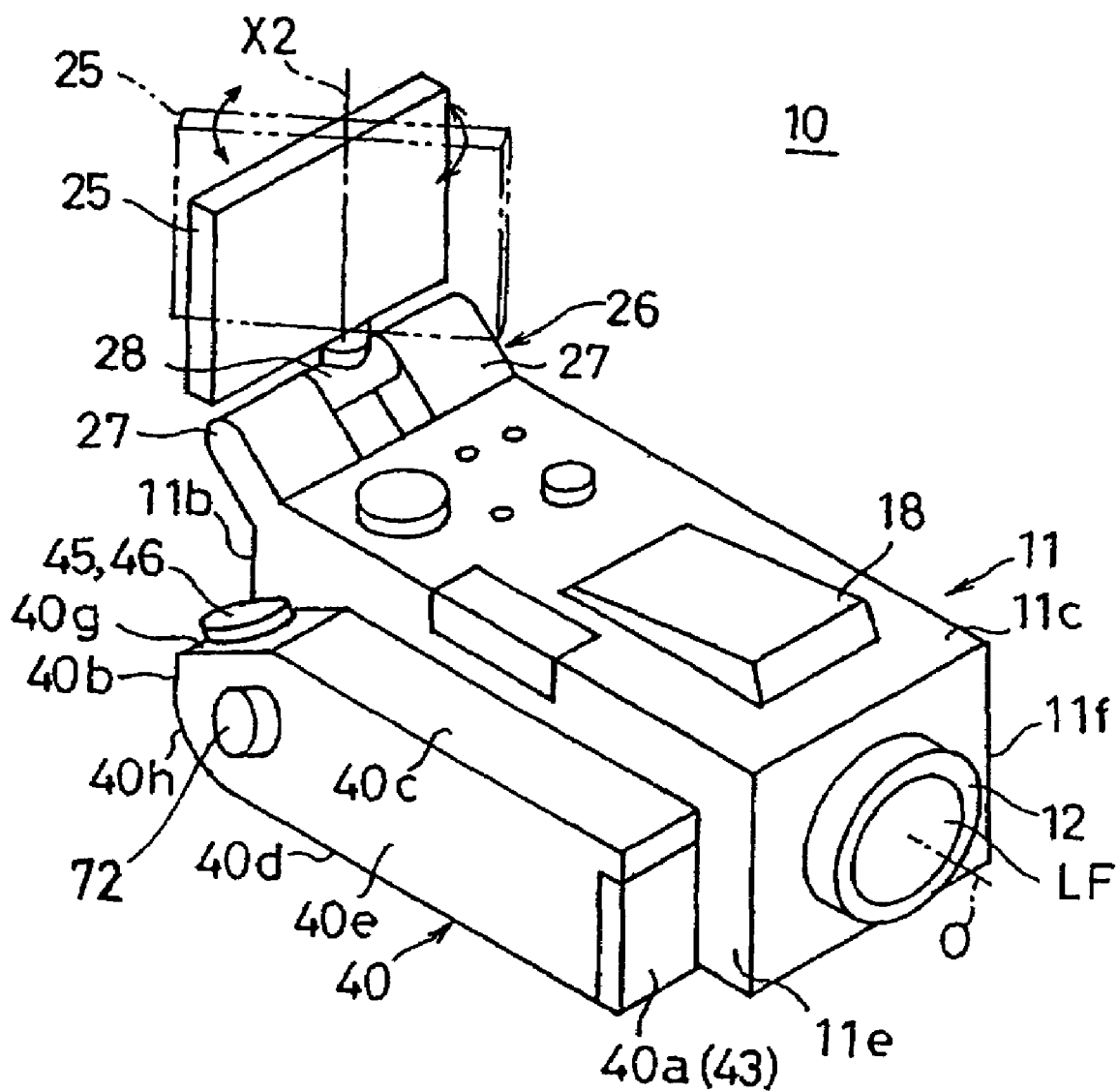
FIG. 10 is a front view in perspective of the digital camera shown in FIGS. 1 and 2, showing a state in which the LCD monitor unit is in an upright position.

As shown in FIG. 10, the LCD monitor unit 25 is supported by the middle support arm 28 to be rotatable on an axis X2 orthogonal to the axis X1. More specifically, a rotational pin 30 projects from a rectangular frame portion 25a of the LCD monitor unit 25 along the axis X2 thereon, while a pin-insertion hole in which the rotational pin 30 is rotatably fitted is formed on the middle support arm 28. Accordingly, the LCD monitor unit 25 is rotatable on both of the axes X1 and X2.

Although the pair of pivot pins 29 project from the middle support arm 28 to be respectively inserted into the pin holes formed on the pair of support arms 27 in the hinge portion 26 in the above illustrated embodiment of the digital camera 10, it is possible for the pair of pivot pins 29 to project from the pair of support arms 27 to be respectively inserted into pin holes formed on the middle support arm 28.

Although the rotational pin 30 projects from the rectangular frame portion 25a of the LCD monitor unit 25 to be rotatably fitted into the pin-insertion hole formed on the middle support arm 28 in the above illustrated embodiment of the digital camera 10, it is possible for the rotational pin 30 to project from the middle support arm 28 to be rotatably fitted into a pin-insertion hole formed on the rectangular frame portion 25a of the LCD monitor unit 25.

Figure 4:
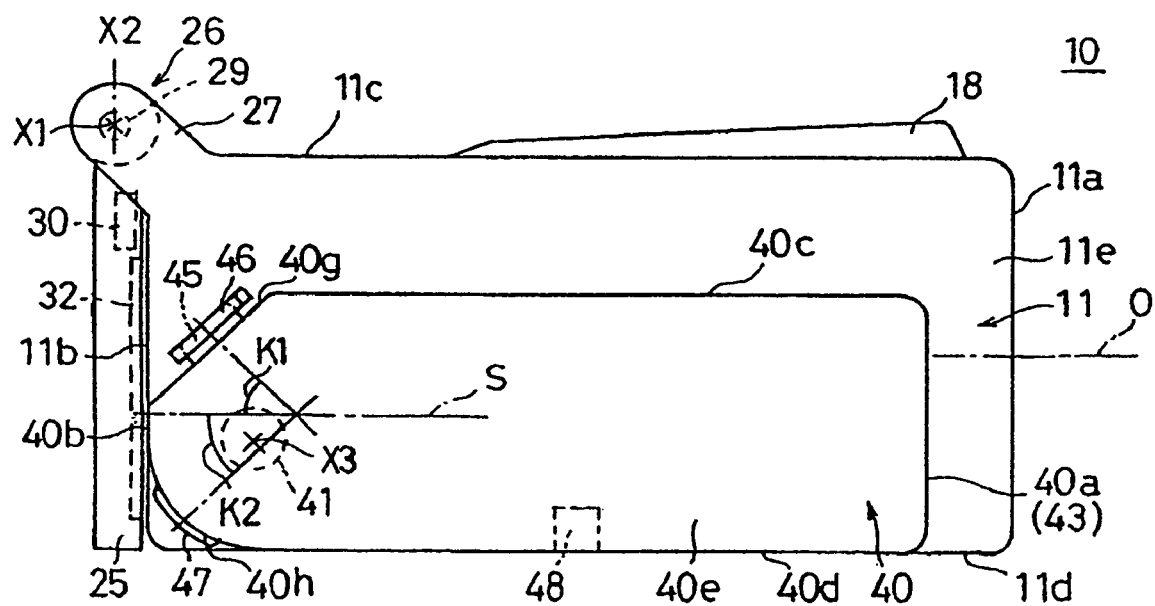
FIG. 4 is a side elevational view of the digital camera shown in FIGS. 1 and 2, viewed from the grip side.
Figure 9:
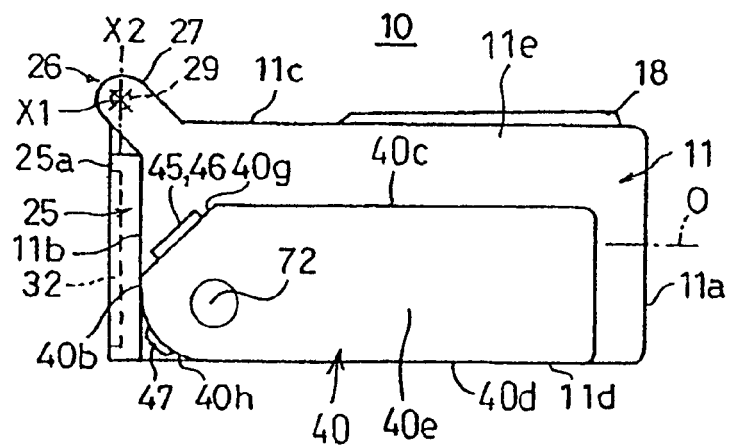
FIG. 9 is a view similar to that of FIG. 4 and shows a state in which the LCD monitor unit is reversed from the position shown in FIG. 4.

The frame portion 25a of the LCD monitor unit 25 is provided with four edge portions surrounding the rectangular LCD portion 32. The shape and size of the LCD monitor unit 25 are determined so that three of the four edge portions of the frame portion 25a, except for one of the four edge portions which is adjacent to the middle support portion 28, are substantially flush with the bottom surface 11d, the right side surface 11e and the left side surface 11f, respectively, when the LCD monitor unit 25 is in the retracted position, in which the LCD monitor unit 25 is positioned on the rear end surface 11b of the camera body 11 as shown in FIGS. 4 and 9 (see FIGS. 3 through 9).

Figure 8:
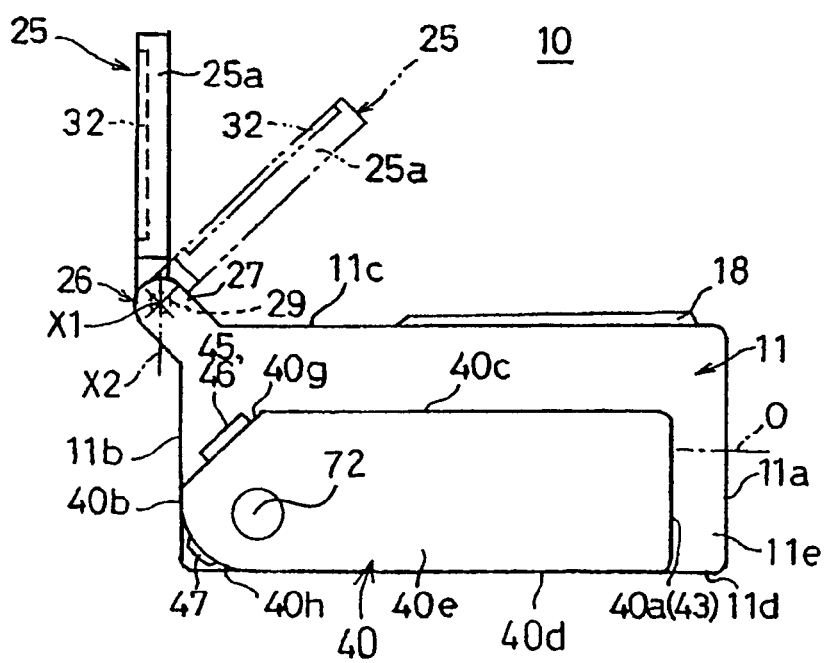
FIG. 8 is aside elevational view of the digital camera shown in FIGS. 1 and 2, showing a state in which an LCD monitor unit is in an upright position.

If the LCD monitor unit 25 is rotated about the axis X1 to stand vertically as shown in FIG. 8 (from the state shown in FIG. 4 in which the LCD portion 32 faces the rear end surface 11b of the camera body 11), the LCD portion 32 faces rearwards (usually toward the user of the digital camera) so that the LCD portion 32 can be used as a monitor for showing the view through the photographing optical system or displaying stored images during playback. Although FIG. 8 shows only two states of the LCD monitor unit 25: a state of the LCD monitor unit 25 that is rotated by approximately 180 degrees from the retracted state thereof to stand vertically (the LCD monitor unit 25 shown by solid lines in FIG. 8), and a state of the LCD monitor unit 25 that is positioned in the aforementioned maximum rotated position (the position shown by two-dot chain lines in FIG. 8), the hinge portion 26 is provided with a frictional mechanism (or a click mechanism) by which the LCD monitor unit 25 can be stopped at other angular positions between the retracted position and the maximum rotated position.

The LCD portion 32 in an upright position can be made to face toward the front of the digital camera 10 by rotating the LCD monitor unit 25 about the axis X2 as shown in FIG. 10. Orientating the LCD portion 32 so as to face the front of the digital camera 10 is suitable for the case where the user photographs himself/herself (self portrait) while holding the digital camera 10. From this position, if the LCD monitor unit 25 is rotated about the axis X1 toward the retracted position to a degree that the LCD portion 32 lies in a plane substantially parallel to the top surface 11c of the camera body 11, the LCD portion 32 becomes suitable as a waist-level monitor. Additionally, from this position, if the LCD monitor unit 25 is further rotated about the axis X1 to the rear end surface 11b, the LCD portion 32 faces toward the rear of the digital camera 10 as shown in FIG. 9, not facing the rear end surface 11b. In this position shown in FIG. 9, the LCD portion 32 can be viewed without the LCD monitor unit 25 projecting (standing up) from the camera body 11. Although the vertical position of the LCD portion 32 is reversed if the LCD monitor unit 25 is rotated from the position shown in FIG. 8 to the position shown in FIG. 9, or from the position shown in FIG. 9 to the position shown in FIG. 8, the digital camera 10 is provided with a detector which detects a variation in orientation of the LCD monitor unit 25 with respect to the camera body 11, and a display image controller so that the LCD portion 32 displays an image in an upright position when viewed by the user. When the digital camera 10 is carried, it is desirable that the LCD monitor unit 25 be in the retracted position with the LCD portion 32 facing the rear end surface 11b as shown in FIG. 4 to prevent the LCD portion 32 from being damaged.

The digital camera 10 is provided on the right side surface 11e with a grip 40. The grip 40 is formed in a substantially rectangular parallelepiped similar to the camera body 11. The outer surface of the grip 40 includes opposite end surfaces (grip end surfaces) 40a and 40b, and four longitudinal side surfaces 40c, 40d, 40e and 40f which are elongated in a direction orthogonal to both of the grip end surfaces 40a and 40b. The grip end surfaces 40a and 40b are substantially parallel to each other, the longitudinal side surfaces 40c and 40d are substantially parallel to each other, and the longitudinal side surfaces 40e and 40f are substantially parallel to each other. The grip 40 is provided inside thereof with a battery chamber in which a battery pack 42 (shown by broken lines in FIG. 1) serving as a power source for driving the digital camera 10 is accommodated. The grip 40 is provided thereon with a battery chamber lid 43, an outer surface of which forms a major portion of the grip end surface 40a.

The grip 40 is pivoted (rotatable) on the camera body 11 about a pivot shaft (extendable pivot shaft/pivot shaft mechanism) 41. The pivot shaft 41 connects the grip 40 to the camera body 11 so that the right side surface 11e of the camera body 11 and the longitudinal side surface 40f of the grip 40 are connected to each other via the pivot shaft 41. An axis (axis of rotation) X3 of the pivot shaft 41 is substantially parallel to the axis X1 of the pair of pivot pins 29 of the hinge portion 26. The position of the pivot shaft 41 (the axis X3) is in the vicinity of the grip end surface 40b, thus being eccentrically positioned from a center of the grip 40 with respect to the lengthwise direction of the grip 40. Accordingly, the grip 40 can be rotated about the axis X3 while the free end of the grip 40 on the grip end surface 40a (the battery chamber lid 43) moves along an arc about the axis X3.

Figure 5:
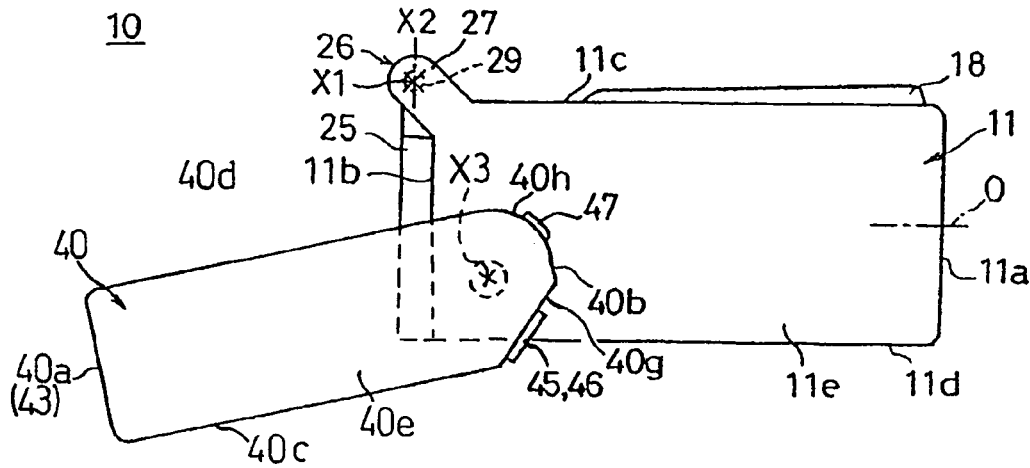
FIG. 5 is a side elevational view of the digital camera shown in FIGS. 1 and 2, showing a state in which the grip is rotated to extend rearwards and slightly downwards from the camera body.

FIG. 4 shows a state in which the grip 40 is positioned at one end (retracted position) in the range of rotation of the grip 40, and FIG. 5 shows a state in which the grip 40 is at the other end of the range of rotation of the grip 40, i.e., the grip 40 is in the rearward-extending position. The positions of the opposite ends 40a and 40b of the grip are substantially reversed between the grip 40 shown in FIG. 4 and the grip 40 shown in FIG. 5. When the grip 40 is positioned in the retracted position as shown in FIG. 4, the grip end surface 40a of the grip 40 (the battery chamber lid 43) faces toward the front of the digital camera 10, the lengthwise direction of the grip 40 is substantially parallel to the lengthwise direction of the camera body 11 (the optical axis direction), and the periphery of the grip 40 is enclosed by the periphery of the right side surface 11e as viewed from the right side of the digital camera 10. In other words, in the state shown in FIG. 4, the entire length of the grip 40 in the lengthwise direction thereof (horizontal direction as viewed in FIG. 4) is included within the length of the camera body 11 in the optical axis direction, while the entire width of the grip 40 in a direction orthogonal to the two longitudinal side surfaces 40c and 40d (in the vertical direction as viewed in FIG. 4) is included within the height of the camera body 11 in the vertical direction of the digital camera 10. Therefore, no part of the grip 40 juts outside the periphery of the camera body 11 in either the forward/rearward direction or the vertical direction of the digital camera 10. Accordingly, in the state shown in FIG. 4, the grip 40 and the camera body 11 appear as a single box unit, so that the digital camera 10 is easy to carry. Moreover, in the state shown in FIG. 4, the digital camera 10 can be placed on a floor or a desk stably because the grip 40 does not project downwards. Accordingly, the digital camera 10 is suitable for taking pictures with the camera body placed on such a flat location without the use of a tripod. When the grip 40 is in the retracted position as shown in FIG. 4, the longitudinal side surface 40d of the grip 40 (the bottom surface of the grip 40 as viewed in FIG. 4) is substantially flush with the bottom surface 11d of the camera body 11 (see FIGS. 3 and 11). This structure improves the stability of the digital camera 10 in the case where the digital camera 10 is placed on a flat location such as a floor or a desk with the bottom surface 11d facing downwards.

During a photographing operation, the grip 40 is rotated clockwise from the retracted position as viewed in FIG. 4 by the user's hand so that the user can thereafter hold the digital camera 10 by holding the grip 40. The pivot shaft 41 is provided with a rotation locking mechanism by which the grip 40 can be stopped at various angular positions between the retracted position (the position shown in FIG. 4) and the rearward-extending position (the position shown in FIG. 5). With the rotation locking mechanism, the angular position of the grip 40 relative to the camera body 10 can be freely selected by the user. The angular position of the LCD monitor unit 25 with respect to the camera body 11 can be freely adjusted by rotating the LCD monitor unit 25 about the axis X1 or on the axis X2 as described above. By rotating the grip 40 about the axis X3 for adjustment, independently of the above described positional adjustment of the LCD monitor unit 25, a high degree of flexibility in photographing posture can be achieved. Specifically, the structure wherein the axis of rotation (the axis X1) of the LCD monitor unit 25 and the axis of rotation (the axis X3) of the grip 40 are parallel to each other and extend in the lateral direction (horizontal direction as viewed in FIG. 3) of the digital camera 10 makes it possible to change both the vertical position and the vertical angle of the digital camera 10 at will, without loss of ability of the digital camera 10 to be held by hand and without loss of viewability of the LCD portion 32.

Figure 11:
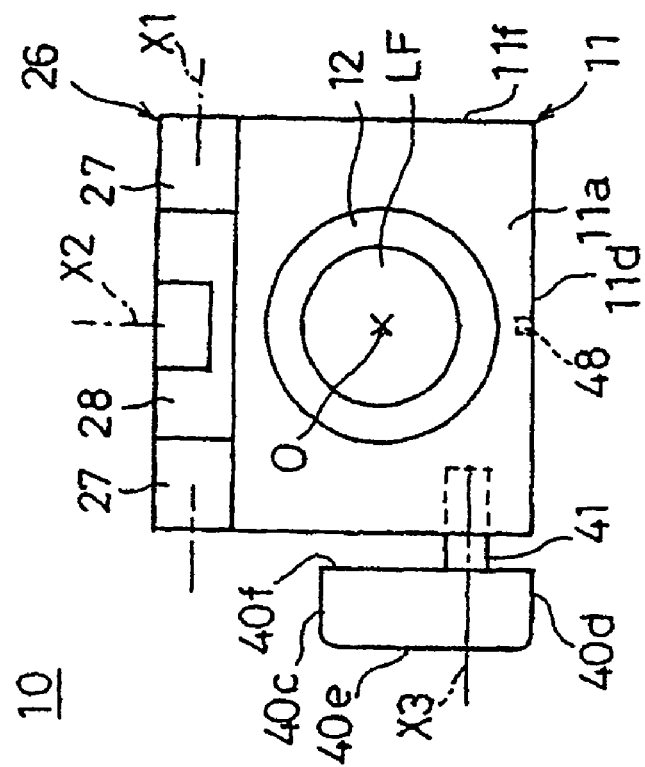
FIG. 11 is a front elevational view of the digital camera shown in FIGS. 1 and 2, showing a state in which the grip is positioned closely to the camera body.
Figure 12:
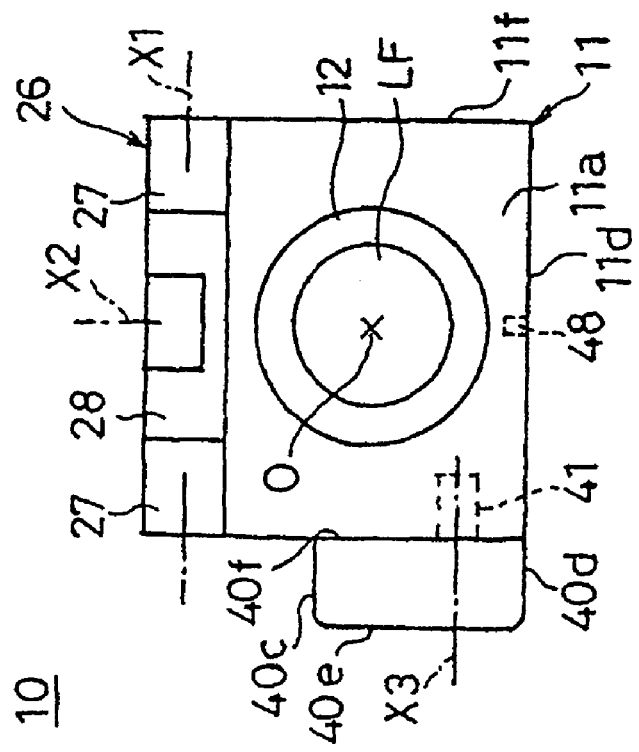
FIG. 12 is a front elevational view of the digital camera shown in FIGS. 1 and 2, showing a state in which the grip is in an extended positioned from the camera body.
Figure 13:
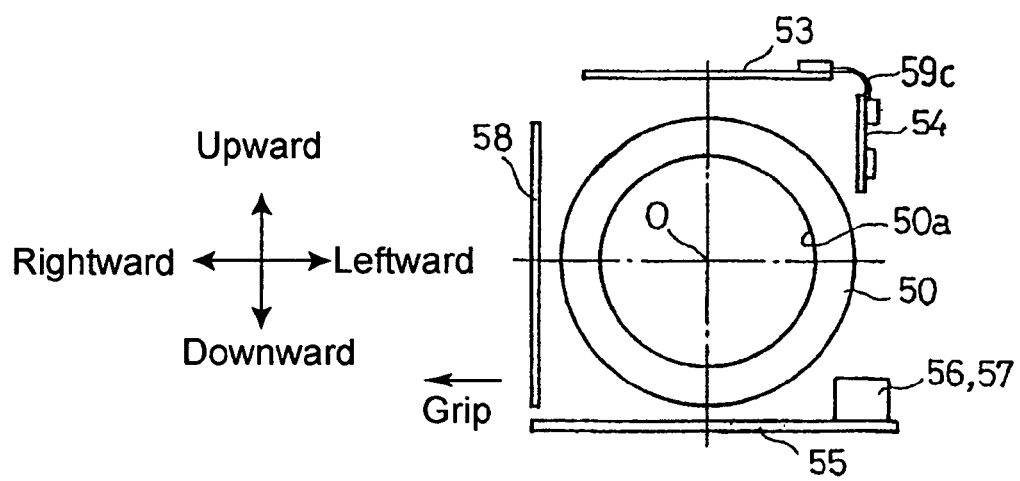
FIG. 13 is a front elevational view of internal elements of the digital camera shown in FIGS. 1 and 2, showing internal circuitry of the camera body.

The pivot shaft 41 is constructed to allow the grip 40 to be positioned on and jutted away from the right side surface 11e of the camera body 11 in a direction along the axis X3 (the lateral direction of the digital camera 10) as shown in FIGS. 11 and 12. This operation of positioning the grip 40 on and jutted away from the right side surface 11e of the camera body 11 can be performed independently of the above described operation of rotating the grip 40 about the axis X3. For instance, the digital camera 10 can be made compact with the grip 40 jutting from the periphery of the camera body 11 by a minimum amount by positioning the grip 40 close to the camera body 11 when the grip 40 is positioned in the retracted position (the position shown in FIG. 4) as shown in FIG. 11. On the other hand, during a photographing operation, wherein the user holds the grip 40, the camera body 11 (specifically the right side surface 11e thereof) and the user's hand which holds the grip 40 are prevented from interfering with each other by pulling the grip 40 outward (leftward as viewed in FIG. 11) to position where the grip 40 juts away from the camera body 11 by a predetermined distance as shown in FIG. 12, which improves the ability of the grip 40 to be held by hand. Although FIG. 12 shows a state in which the lengthwise direction of the grip 40 is substantially parallel to the lengthwise direction of the camera body 11, from this state the grip 40 can be rotated about the axis X3 to be freely set at any angular position relative to the camera body 11.

As described above, the grip 40 is formed in a substantially box shape (rectangular parallelepiped), and the outer surface of the grip 40 is provided with three pairs of flat surfaces (the two grip end surfaces 40a and 40b, the two longitudinal side surfaces 40c and 40d, and the two longitudinal side surfaces 40e and 40f). The outer surface of the grip 40 is further provided in the vicinity of the grip end surface 40b with an inclined surface 40g which connects the grip end surface 40b with the longitudinal side surface 40c, and a curved surface 40h which constitutes a chamfered portion of the grip end surface 40b at the portion thereof which extends to the longitudinal side surface 40d. The inclined surface 40g, the grip end surfaces 40a and 40b, the curved surface 40h and the longitudinal side surfaces 40c and 40d constitute a surrounding surface which is substantially parallel to the axis X3 and surrounds the axis X3. The inclined surface 40g is formed as a surface non-parallel to any other external surface of the grip 40. The grip 40 is provided on the inclined surface 40g with a release button 45 and a ring-shaped zoom switch 46 which surrounds the release button 45. The curved surface 40h of the grip end surface 40b is formed to have an external positive curvature. The grip 40 is provided on the curved surface 40h with a moving-image recording button 47. The release button 45 serves as a manual operational member for photographing still images. A photometry operation and a distance measuring operation are carried out when the release button 45 is depressed halfway down, and a shutter is released when the release button 45 is fully depressed. A photographing mode and other settings are set with the above described various manual operational members as appropriate. On the other hand, the moving-image recording button 47 serves as a manual operational member for recording moving images. An operation of recording moving images commences immediately after the moving-image recording button 47 is depressed once, and thereafter stops immediately after the moving-image recording button 47 is depressed once again. The still images and moving images are processed via an image processor to be stored in a memory card as electronic image data.

Figure 6:
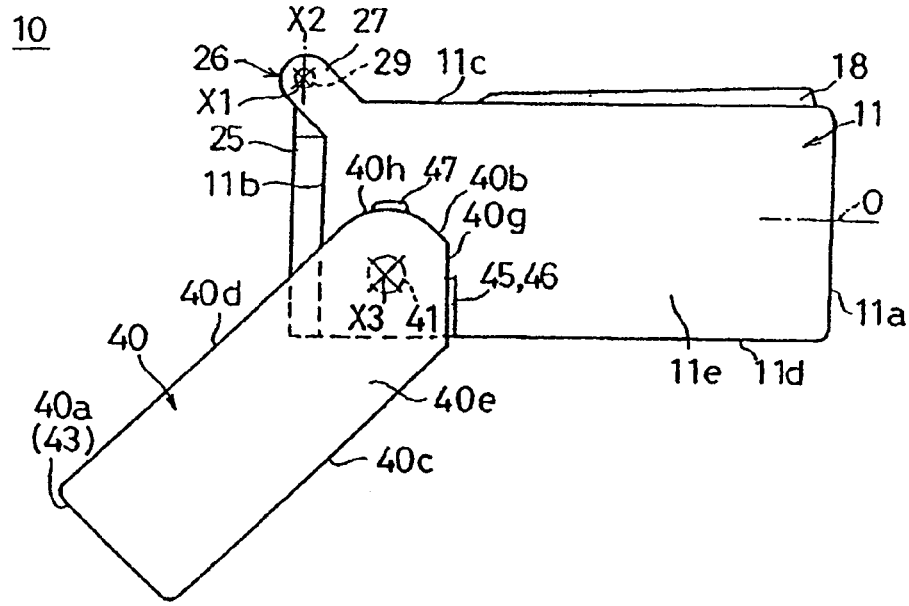
FIG. 6 is a side elevational view of the digital camera shown in FIGS. 1 and 2, showing a state in which the grip is rotated to extend obliquely downwards from the camera body.

As shown in FIG. 4, the inclined surface 40g is formed on the camera body 11 so as to be neither parallel nor orthogonal to a straight line S which extends in a lengthwise direction of the grip 40 between the longitudinal side surfaces 40c and 40d. It is desirable that an angle of inclination K1 of the inclined surface 40g relative to the straight line S be set at an angle between 15 to 75 degrees, more desirably between 30 to 60 degrees. The release button 45 on the inclined surface 40g faces toward the front of the digital camera 10 when the grip 40 is positioned so that the grip end surface 40a (the battery chamber lid 43) faces obliquely rearward and in a downward direction as shown in FIG. 6. In an ordinary photographing posture in which the user holds the digital camera 10 at eye-level or in the vicinity thereof, it is assumed that the grip 40 is positioned within a angular range thereof with the angle of the grip 40 shown in FIG. 6 at a central angle of the angular range. Considering the shape of a human hand, the release button 45 can be easily operated by an index finger (forefinger) if the grip 40 extends obliquely rearward, in a downward direction so that the release button 45 faces substantially toward the front of the digital camera 10 as shown in FIG. 6.

When the grip 40 is in the angular position shown in FIG. 6, the moving-image recording button 47 faces a substantially upward direction of the digital camera 10 so that the position of the moving-image recording button 47 naturally corresponds to the position of the thumb of the user's hand (right hand in the present embodiment of the digital camera) which holds the grip 40 when the index finger is put on the release button 45, due to the moving-image recording button 47 being provided on the grip end surface 40b that is adjacent to the inclined surface 40g and non-orthogonal to the inclined surface 40g. The moving-image recording button 47 is positioned on the curved surface 40h, which is chamfered so as to have an external positive curvature, and also the moving-image recording button 47 projects obliquely outwards in an inclination direction substantially opposite (symmetrical) to the axis of the release button 45 with respect to the straight line S (which extends in a lengthwise direction of the grip 40 between the longitudinal side surfaces 40c and 40d, as shown in FIG. 4). With this positional relationship between the moving-image recording button 47 and the release button 45, in which the pressing direction of the moving-image recording button 47 is inclined with respect to the pressing direction of the release button 45, the thumb of the user's hand (right hand in the present embodiment of the digital camera) holding the grip 40 can be put on the moving-image recording button 47 more naturally, which further improves the operability of the digital camera 10. It is desirable that an angle of inclination K2 of the moving-image recording button 47 relative to the straight line S be set at an angle substantially equal to the angle K1 of the inclined surface 40g (i.e., an angle of the release button 45 relative to the straight line S).

Accordingly, when the grip 40 is in the angular position shown in FIG. 6, in which the grip 40 is orientated to extend obliquely downwards, or in an angular position in the vicinity thereof, the release button 45 substantially faces an upward direction of the digital camera 10, the moving-image recording button 47 substantially faces a frontward direction of the digital camera 10, and the position of the moving-image recording button 47 naturally corresponds to the position of the thumb of the user's hand when the user holds the grip 40 with the index finger placed on the release button 45. Namely, the release button 45 and the moving-image recording button 47 are disposed on the grip 40 at positions so as to allow the user to operate the release button 45 and the moving-image recording button 47 easily and naturally when the grip 40 is rotated to be set in an operating position (ready-to-photograph position) as shown in FIG. 6.

The angle of the grip 40 relative to the camera body 11 in a ready-to-photograph state is not limited solely to those shown in FIGS. 5 and 6. For instance, when the user takes still or moving images while holding the digital camera 10 above their head, the grip 40 may be positioned at a substantially right-angle relative to the camera body 11 so that the grip end surface 40a (the battery chamber lid 43) faces vertically downwards. In this case, it is conceivable that the user holds the grip 40 with their hand while straightening the arm vertically upwards so that the arm extends in a direction substantially parallel to the lengthwise direction of the grip 40, and accordingly, the index finger and the thumb of the hand holding the grip 40 can be naturally placed on the release button 45 and the moving-image recording button 47, respectively, similar to the case shown in FIG. 6, which allows the user to operate the release button 45 and the moving-image recording button 47 comfortably.

The grip 40 is supported on the pivot shaft 41 at a position on the grip 40 which is eccentric to a center of the grip 40 in the lengthwise direction thereof to be positioned in the vicinity of the grip end surface 40b, and the release button 45 and the moving-image recording button 47 are disposed at positions on the grip 40 in radially outward directions from the pivot shaft 41 (the axis X3) in the relatively close vicinity of the pivot shaft 41. Accordingly, the positions of the release button 45 and the moving-image recording button 47 are not displaced largely with respect to the camera body 11 when the grip 40 is rotated relative to the camera body 11, which does not easily deteriorate the operability of each of the release button 45 and the moving-image recording button 47. Additionally, the release button 45 and the moving-image recording button 47 are positioned substantially on an imaginary cylindrical surface about the pivot shaft 41 (the axis X3), so that neither the distance from the pivot shaft 41 to the release button 45 nor the distance from pivot shaft 41 to the moving-image recording button 47 changes even if the grip 40 is rotated. This arrangement also facilitates the operability of the release button 45 and the moving-image recording button 47.

As can be understood from the above description, the positions of the release button 45 and the moving-image recording button 47 are determined so that the user can easily operate the release button 45 and the moving-image recording button 47 regardless of the angle of the grip 40 relative to the camera body 11.

The camera body 11 is provided on the bottom surface 11d with a tripod socket (female screw hole) 48 which is open downwards from the camera body 10 (see FIG. 4). Since the LCD monitor unit 25 and the grip 40 are supported on the rear end surface 11b and the right side surface 11e, respectively, neither the LCD monitor unit 25 nor the grip 40 overlap the bottom surface 11d of the camera body 11 even if rotated. Therefore, the tripod socket 48 is never covered by either of the LCD monitor unit 25 or the grip 40. Accordingly, even though the digital camera 10 is provided on the camera body with two independent rotatable members: the grip 40 and the LCD monitor unit 25, a photographing operation using a tripod can be carried out regardless of the of the positions of the LCD monitor unit 25 and the grip 40. Moreover, the digital camera 10 can be stably put on a floor or the like without the use of a tripod if the grip 40 is rotated to the retracted position. Namely, the digital camera 10 can be used not only in an ordinary situation in which the user takes still or moving images while holding the digital camera 10 with their hand but also in other photographing positions.

In a photographing operation, with the user holding the digital camera 10, it is generally the case that the user holds the digital camera 10 with their right hand gripping the grip 40 and with their left hand holding the camera body 11. Furthermore, it is normally the case that the palm of the left hand supports the camera body 11 from the bottom surface 11d while the thumb of the left hand is laid on the left side surface 11f, and accordingly, there is little possibility of performing an unintentional operation due to no manual operational members being provided on the bottom surface 11d. The bottom surface 11d comes in contact with the left hand by an area larger than any other external surface portions of the digital camera 10. Moreover, the photographing mode and other settings can be set without changing the user's photographing posture because the manual operational members which are frequently used during photographing, such as the flash mode select button 20, the drive mode select button 21 and the focus mode select button 22, are positioned on the left side surface 11f, on which the thumb of the left hand is placed.

During playback of recorded still and/or moving images on the LCD portion 32, it is assumed that the user holds the digital camera 10 with the fingers placed on the upper surface 11c of the camera body 11. Accordingly, manual operational members used for playback images are positioned on the top surface 11c, so that the user can easily operate these manual operational members without changing the above described photographing posture. During playback of recorded still and/or moving images, the user can hold the digital camera 10 with both hands holding the camera body 11 with the grip 40 positioned in the retracted position.

FIGS. 13 through 16 show the internal circuitry of the camera body 11, viewed from different angles. The digital camera 10 is provided in the camera body 11 with a hollow-cylindrical holder 50 which holds and accommodates the photographing optical system of the digital camera 10. The holder 50 holds the photographing optical system so that the axis of the holder 50 extends in the optical axis direction. The holder 50 is provided at the front end thereof with an aperture 50a (see FIG. 13) for holding the frontmost lens group LF therein. The digital camera 10 is provided in the camera body 11 with a CCD image sensor 51 mounted to a CCD fixing plate 52. The CCD image sensor 51 is fixed at the rear end of the holder 50 via the CCD fixing plate 52. Although the holder 50, that serves as a holding member for holding the photographing optical system, is formed as a single member for the purpose of making the location of the photographing optical system easier to recognize, the holding member does not have to be formed as a single member like the holder 50.

The CCD image sensor 51 and other optical elements such as the frontmost lens group LF are elements of the photographing optical system of the digital camera 10. The CCD fixing plate 52 is positioned between the rear end of the holder 50 and the rear end surface 11b of the camera body 11 to 11e in a plane substantially orthogonal to the optical axis O. In addition to the CCD fixing plate 52, the digital camera 10 is provided in the camera body 11 with a first switch substrate 53, a second switch substrate 54, a jack substrate 55 and a main substrate 58. The first switch substrate 53 is formed as a flat board, and is positioned between the holder 50 and the top surface 11c of the camera body 11 to be substantially parallel to the top surface 11c. The power button 13, the mode select dial 14, the playback button 15, the menu button 16 and the multi-direction button 17 are mounted to the first switch substrate 53. The second switch substrate 54 is formed as a flat board, and is positioned between the holder 50 and the left side surface 11f of the camera body 11 to be substantially parallel to the left side surface 11f. The flash mode select button 20, the drive mode select button 21 and the focus mode select button 22 are mounted to the second switch substrate 54. The jack substrate 55 is formed as a flat board, and is positioned between the holder 50 and the bottom surface 11d of the camera body 11 to be substantially parallel to the bottom surface 11d. A PC jack 56 for connection to a personal computer and an adapter jack 57 for power adapter (e.g., AC adapter) are mounted to the jack substrate 55. The PC jack 56 and the adapter jack 57 are positioned on the left side surface 11f to be accessible from the outside of the camera body 11 if the external connector cover 24 is opened. The main substrate 58 is formed as a flat board, and is positioned between the holder 50 and the right side surface 11e of the camera body 11 to be substantially parallel to the right side surface 11e. Various components such as a microcomputer for controlling the overall operation of the digital camera 10 and a circuit for processing image data are mounted to the main substrate 58. The main substrate 58 is greater in length than the first switch substrate 53, the second switch 54 and the jack substrate 55 in the optical axis direction (forward/rearward direction of the digital camera 10). The CCD fixing plate 52 and the first switch substrate 53 are connected to the main substrate 58 via a flexible PWB (printed-wiring board) 59a and a flexible PWB 59b, respectively. The second switch substrate 54 is connected to the first switch substrate 53 via a flexible PWB 59c to send signals to the main substrate 58 via the first switch substrate 53. The jack substrate 55 is connected to the main substrate 58 via a connector 55a.

As can be seen from FIGS. 13 through 16, the photographing optical system (the holder 50) of the digital camera 10 is positioned in an internal space thereof which is surrounded by a circuit board consisting of the CCD fixing plate 52, the first switch substrate 53, the jack substrate 55 and the main substrate 58. Specifically, the photographing optical system that is provided in the present embodiment of the digital camera is an internal-focusing/zooming optical system, in which the focus or the focal length is altered by moving elements internally within the lens barrel as mentioned above, and accordingly, no portion of the photographing optical system projects forward from the front of the camera body 11, and therefore remains within the camera body 11 at all times. Additionally, the CCD fixing plate 52, the first switch substrate 53, the jack substrate 55 and the main substrate 58 are positioned in the camera body 11 to surround the photographing optical system. This circuit arrangement saves space for electrical components in the camera body 11, thus contributing to improvement in degree of freedom in miniaturization and design of the digital camera 10. The camera body 11 is formed as a substantially rectangular parallelepiped which is elongated along the optical axis O specifically in the illustrated embodiment of the digital camera as mentioned above, and this shape of the camera body 11 is advantageous for installing the first switch substrate 53, the second switch substrate 54, the jack substrate 55 and the main substrate 58 along an inner surface of the camera body 11 which extends in the lengthwise direction of the camera body 11.

In the present embodiment of the digital camera, the rotatable grip 40 is mounted to the right side surface 11e of the camera body 11. It is desirable that no elements such as operational switches or terminals (jacks) be provided on a surface of the camera body to which a rotatable member such as the grip 40 is mounted in order to prevent the rotatable member from interfering with such elements. Accordingly, the first switch substrate 53 and the second switch substrate 54, which include switch contacts, and the jack substrate 55, which includes electrical terminals, are installed along three inner surfaces of the camera body 11 which correspond to the top surface 11c, the bottom surface 11d and the left side surface 11f, respectively, and no substrate is installed along an inner surface of the camera body 11 which corresponds to the right side surface 11e. By taking advantage of this structure in which no elements such as switches or terminals are installed (cannot be installed) to the right side surface 11e of the camera body 11, the main substrate 58, which does not have to be connected to any external parts or devices, is installed in the immediate area of the inner surface of the camera body 11 which corresponds to the right side surface 11e. As can be seen from FIGS. 14 and 15, the internal space of the camera body 11 on the right side surface 11e is exclusively assigned to the installation of the main substrate 58, which makes it possible to adopt the large main substrate 58 that is shaped to have a length close to the length of the holder 50 in the optical axis direction.

Likewise, no elements such as switches or terminals are installed on the rear end surface 11b of the camera body 11, which supports the movable LCD monitor unit 25 (a movable member like the grip 40), while the CCD fixing plate 52, which does not have to be connected to any external parts or devices similar to the main substrate 58, is installed in the immediate area of an inner surface of the camera body 11 which corresponds to the rear end surface 11b. In terms of the efficiency of saving space and simplifying the circuitry, it is desirable that the CCD fixing plate 52, on which the CCD image sensor 51 is mounted, be positioned in the internal space of the camera body 11 in the vicinity of the rear end surface 11b since the internal space of the camera body 11 in the vicinity of the rear end surface 11b is adjacent to the rear end of the photographing optical system.

As can be understood from the above descriptions, in the above illustrated embodiment of the digital camera, a high degree of flexibility in photographing posture and an improvement in operability of the digital camera 10 are achieved by designing the LCD monitor unit 25 and the grip 40 to be rotatable independently of each other. In addition, the release button 45 and the moving-image recording button 47 are easy to operate regardless of the rotational position (angular position) of the grip 40.

Figure 17:
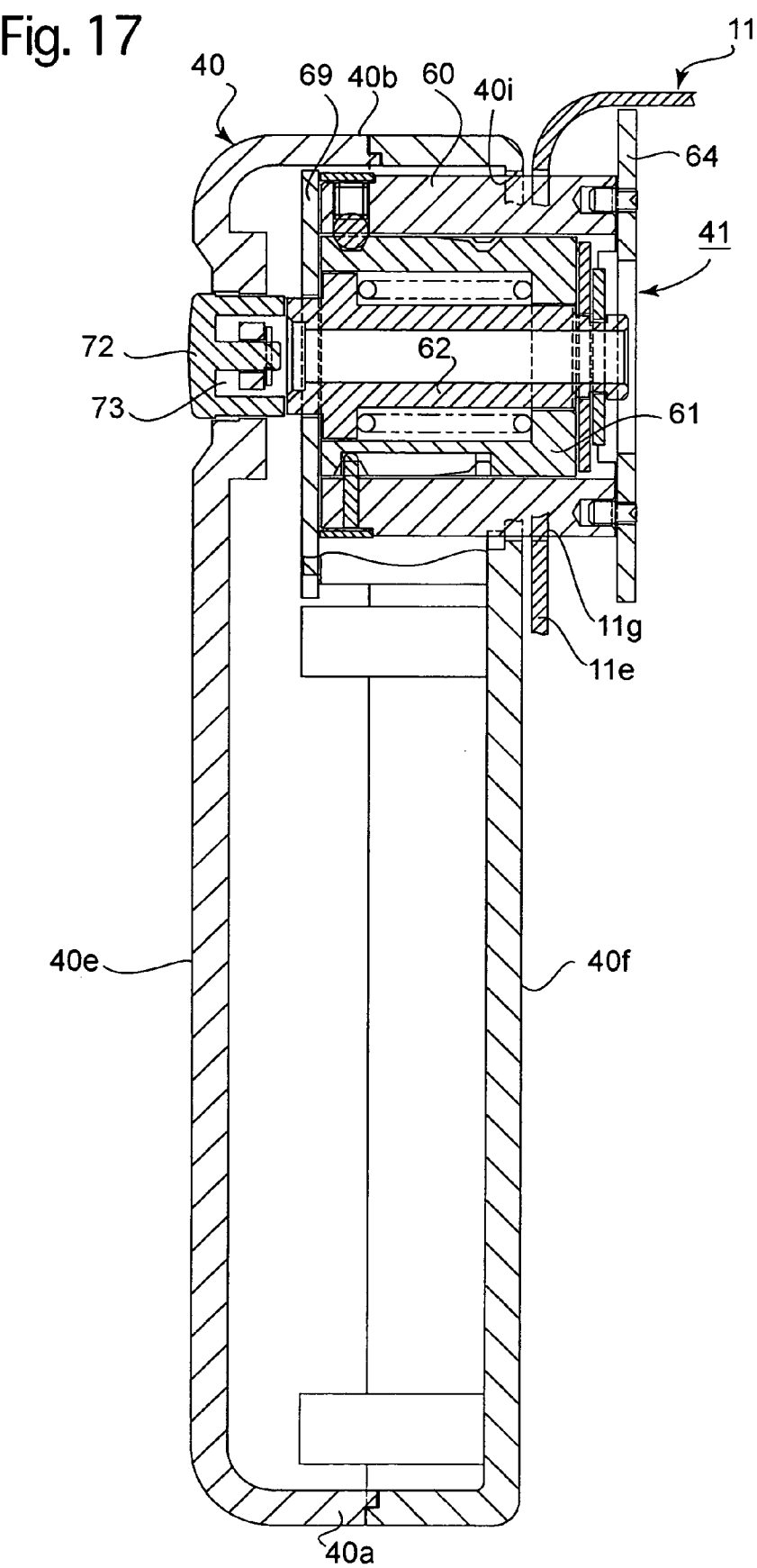
FIG. 17 is a cross sectional view of the grip of the digital camera shown in FIGS. 1 and 2 when the grip is in a retracted position, taken along a plane which includes the axis of the extendable pivot shaft of the grip and an axis of the grip in the lengthwise direction thereof.
Figure 20:
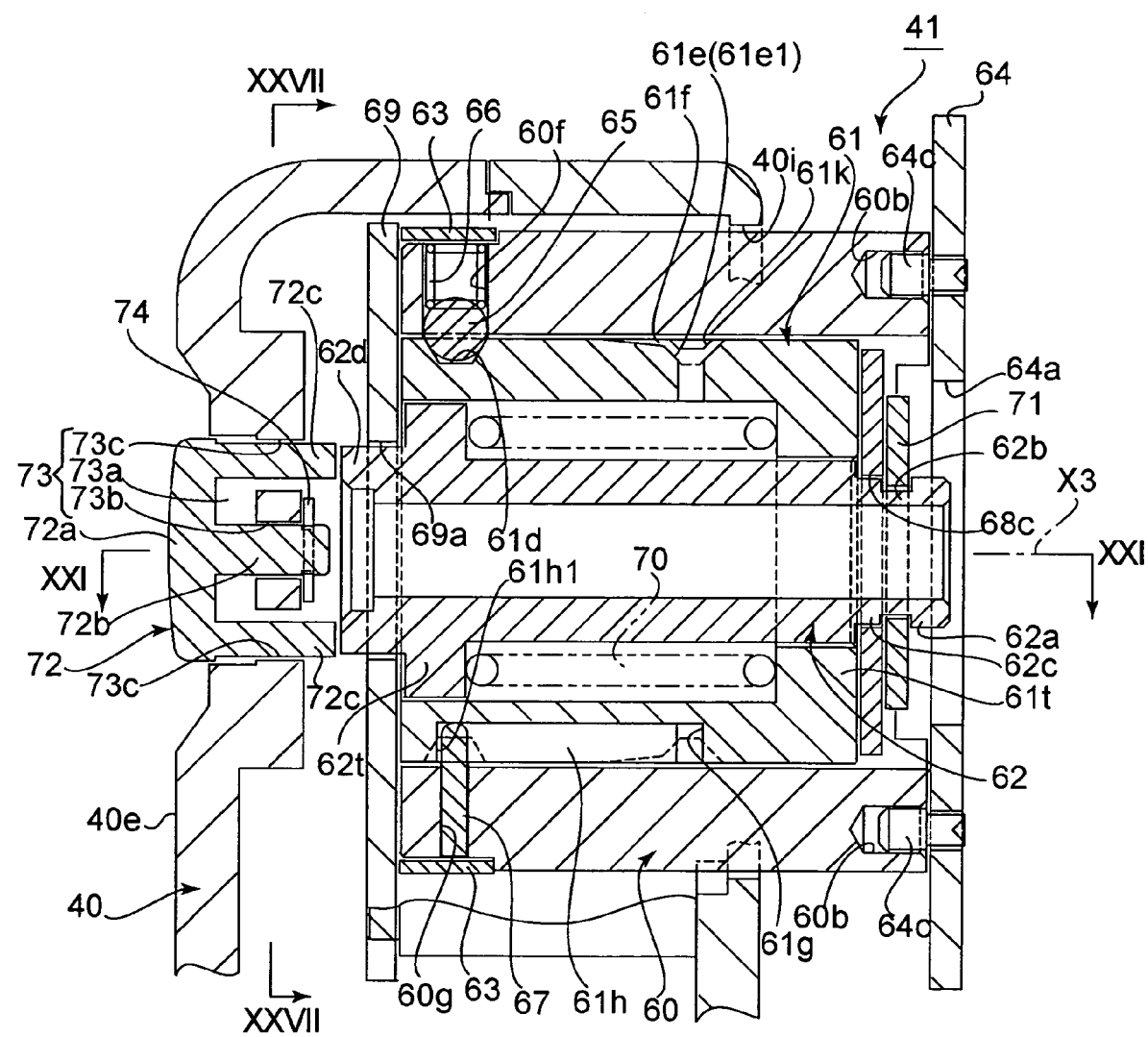
FIG. 20 is an enlarged cross sectional view of a portion of the grip in the vicinity of the extendable pivot shaft when the grip is in the retracted position of FIG. 17.
Figure 21:
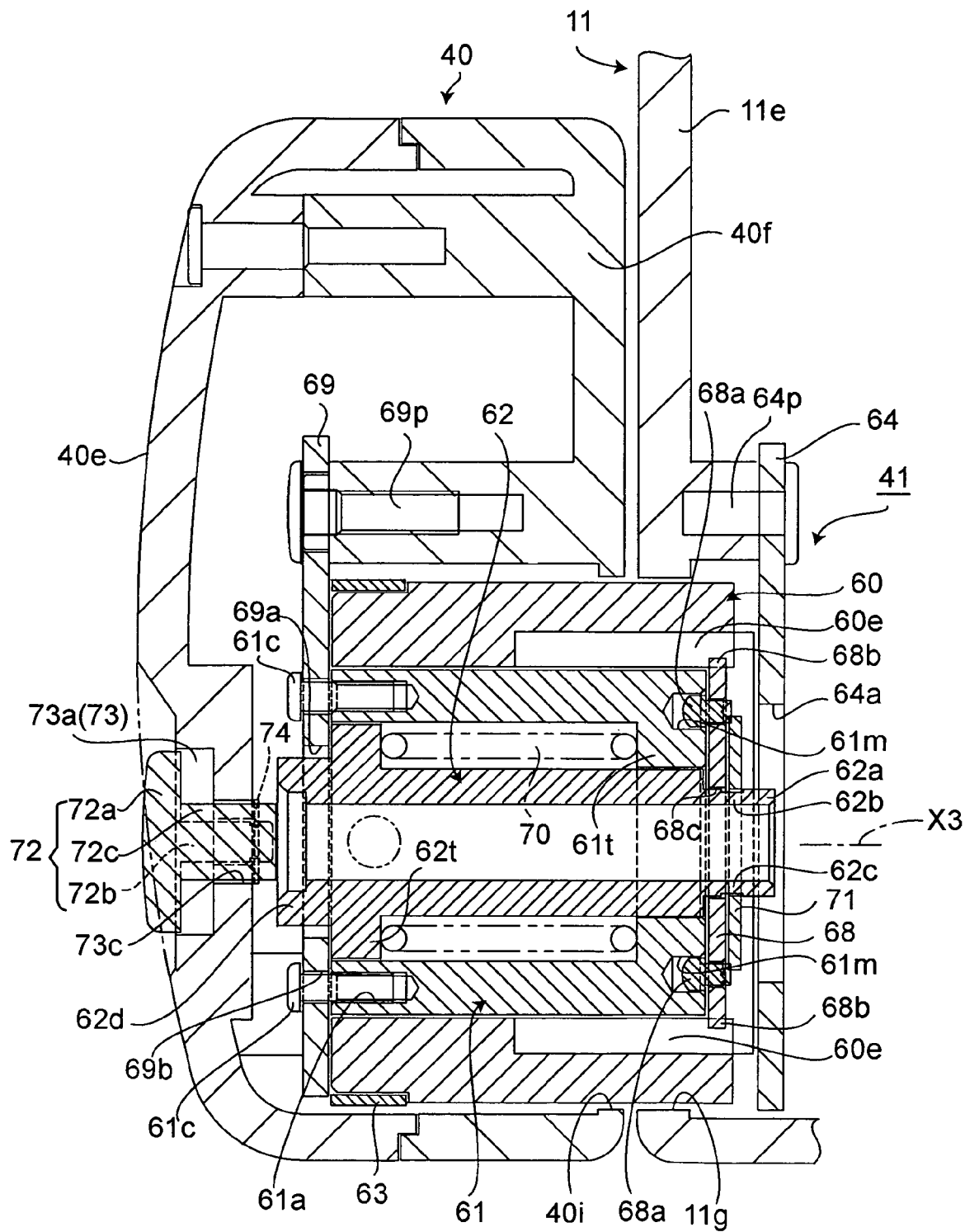
FIG. 21 is a cross sectional view taken along the XXI-XXI line shown in FIG. 20 when the grip is in the retracted position.
Figure 22:
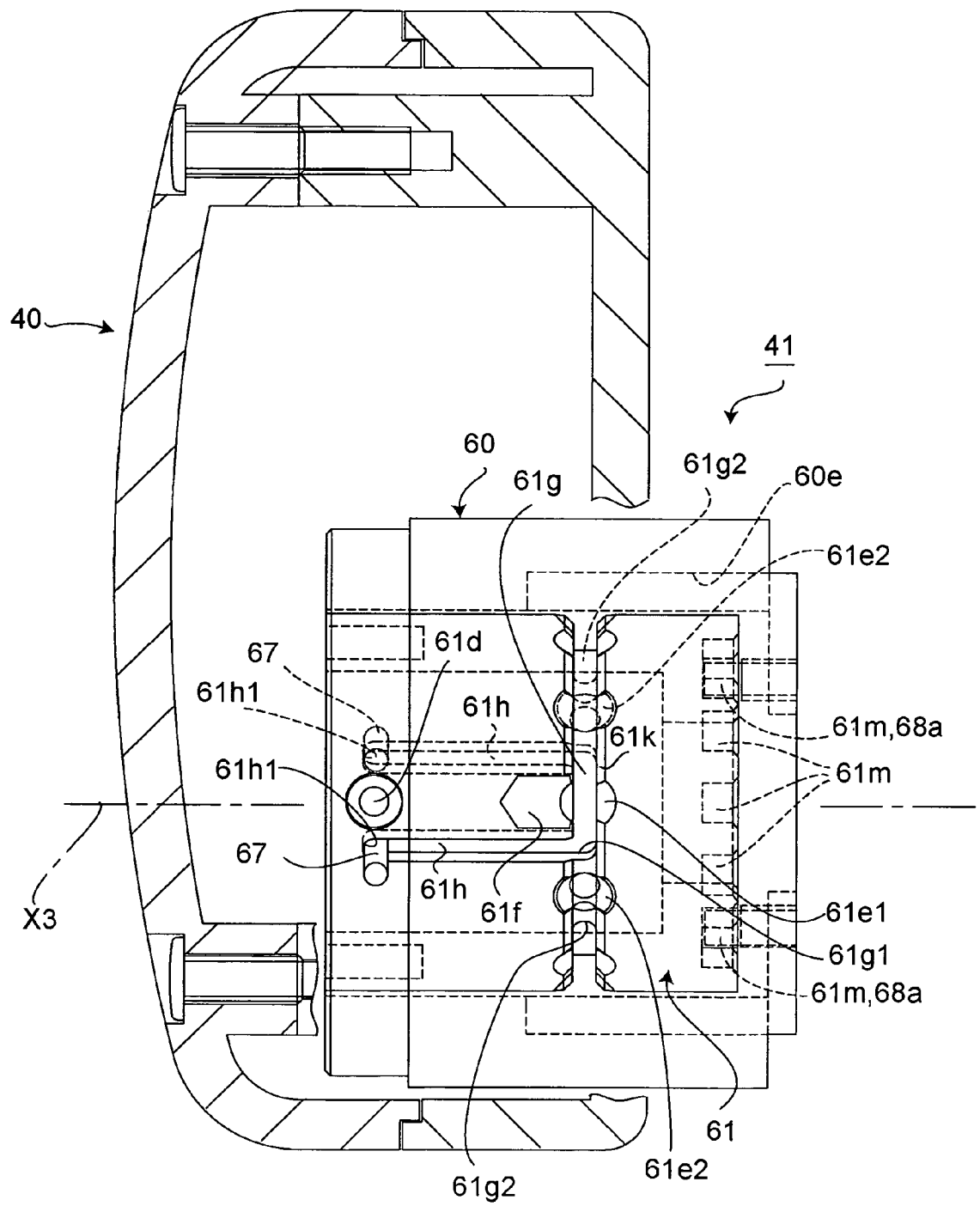
FIG. 22 is a view similar to that of FIG. 21, showing the outward appearance of an outer cylinder and a middle cylinder, when the grip is in the retracted position.
Figure 23:
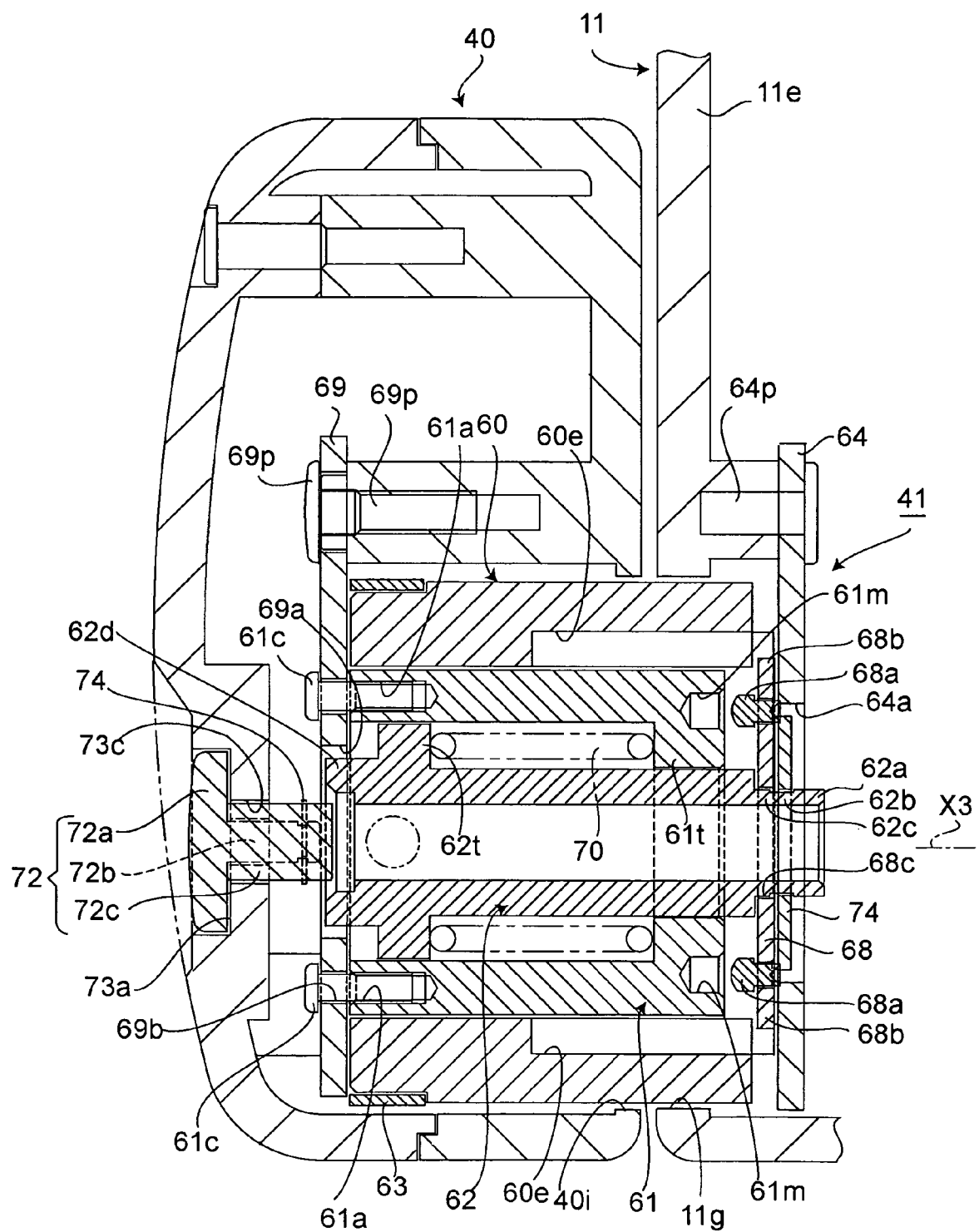
FIG. 23 is a view similar to that of FIG. 21, showing a state in which a rotation-lock release button is pressed when the grip is in the retracted position.

The structure of the pivot shaft 41 will be hereinafter discussed in detail with reference to FIGS. 17 through 39. As shown in FIG. 17, the right side surface 11e of the camera body 11 and the longitudinal side surface 40f of the grip 40 which face each other are provided with a pivot shaft insertion hole 11g and a pivot shaft insertion hole 40i, respectively, which are aligned in the direction of the pivot shaft 41 (the axis X3). The digital camera 10 is provided in the grip 40 with a grip-side pivot support plate 69 which is fixed to an internal stationary portion of the grip 40, and is provided in the camera body 11 with a body-side pivot support plate 64 which is fixed to the camera body 11 so that the pivot shaft insertion holes 11g and 40i are positioned between the body-side pivot support plate 64 and the grip-side pivot support plate 69. The body-side pivot support plate 64 is fixed to the camera body 11 by set screws 64p (only one of them is shown in FIGS. 21 and 23), while the grip-side pivot support plate 69 is fixed to an internal stationary portion of the grip 40 by set screws 69p (only one of them is shown in FIGS. 21 and 23). The pivot shaft 41 passes through the pivot shaft insertion holes 11g and 40i so that the opposite ends of the pivot shaft 41 are supported by the grip-side pivot support plate 69 and the body-side pivot support plate 64, respectively.

Figure 18:
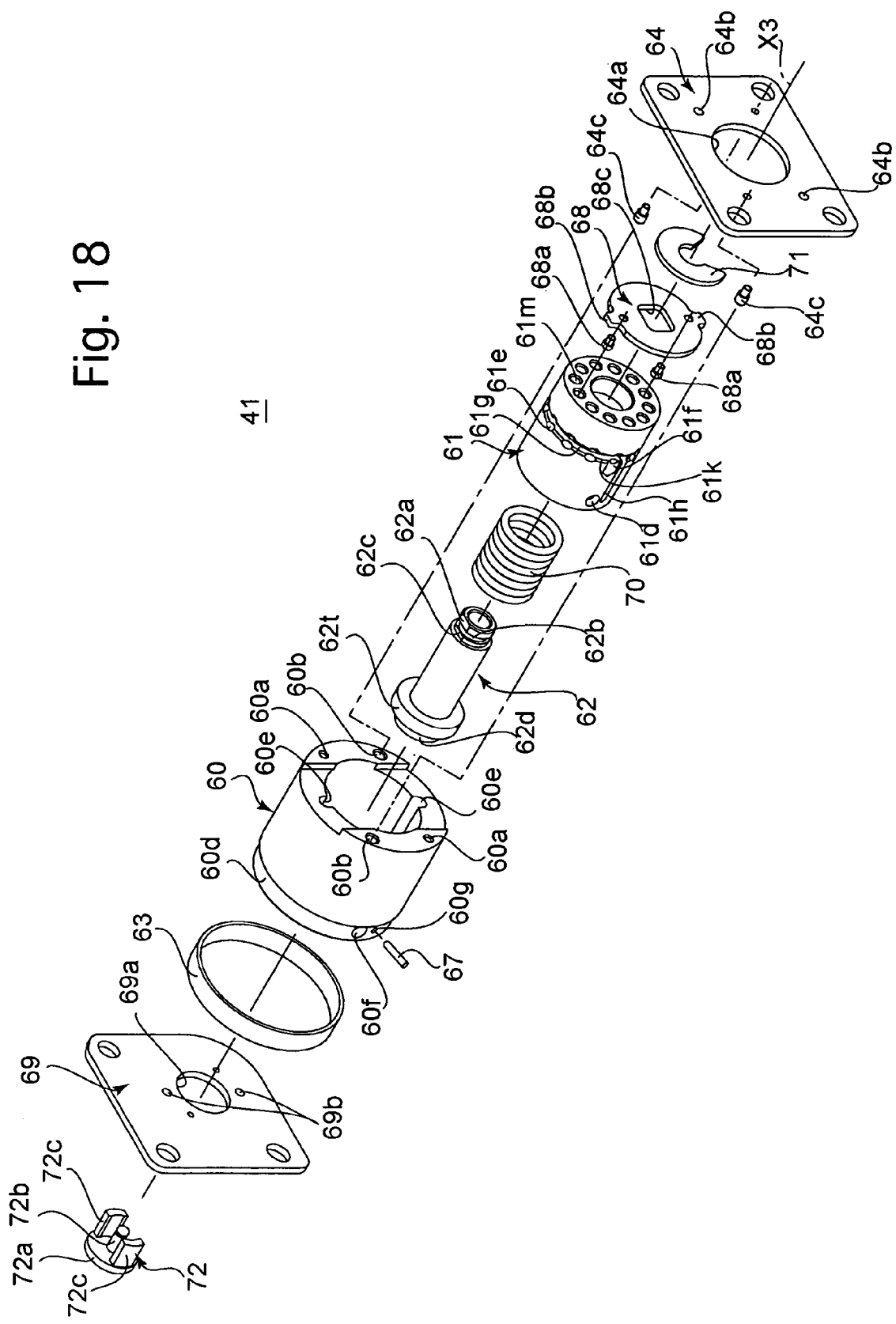
FIG. 18 is an exploded perspective view of the extendable pivot shaft mechanism, showing elements thereof.
Figure 19:
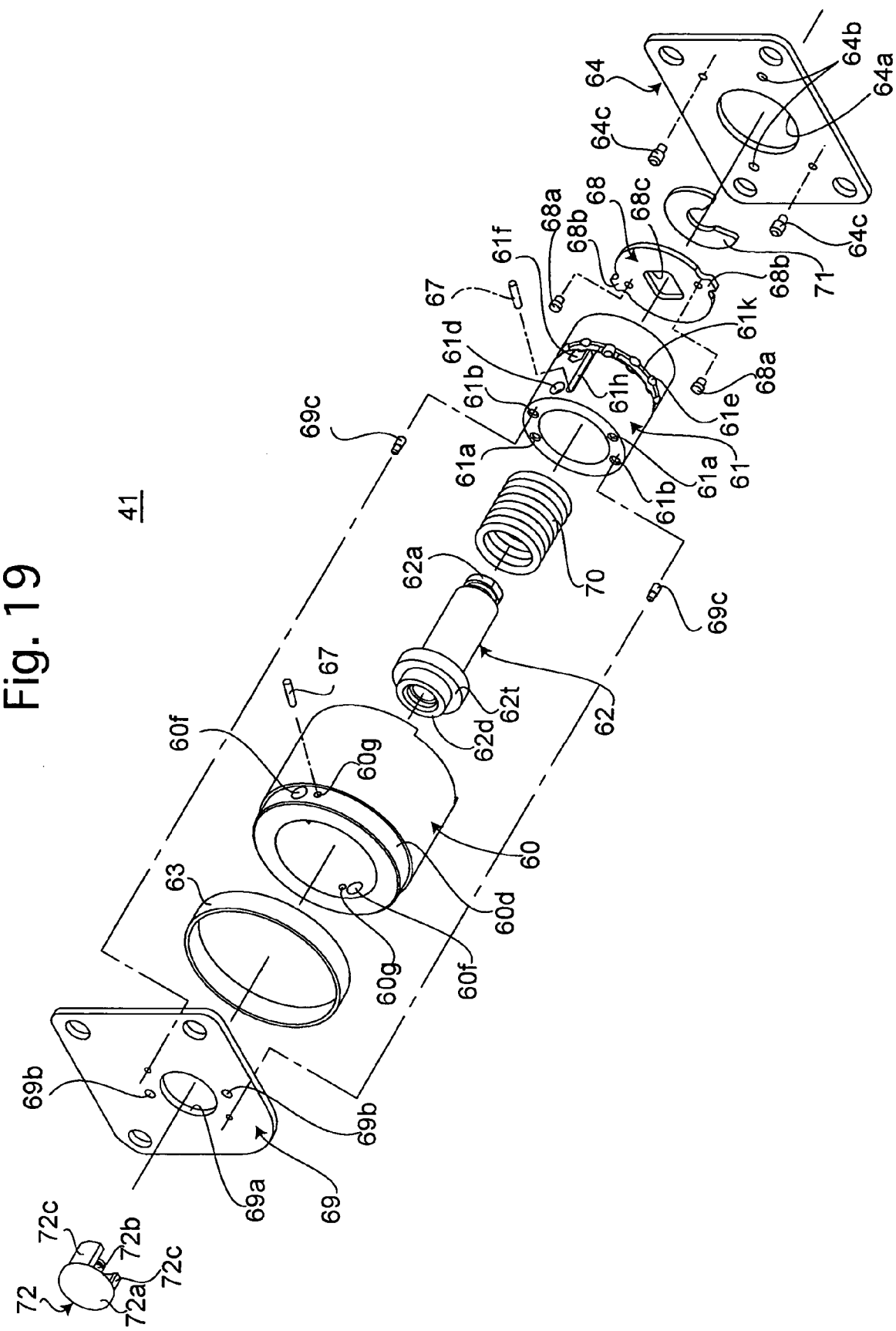
FIG. 19 is an exploded perspective view of the extendable pivot shaft mechanism, viewed from a different angle.

As shown in FIGS. 18 and 19, the body-side pivot support plate 64 is provided at a substantially center thereof with a central circular through-hold 64a, and is provided around the central circular through-hole 64a with a pair of through-holes 64b and a pair of positioning pins 64c fixed to the body-side pivot support plate 64. The pair of through-holes 64b are positioned to be symmetrical with respect to the axis X3 of the pivot shaft 41. Likewise, the pair of positioning pins 64c are positioned to be symmetrical with respect to the axis X3 of the pivot shaft 41. The grip-side pivot support plate 69 that is positioned on the grip 40 side is provided with a central through-hole 69a having its center on the axis X3, a pair of through-holes 69b positioned to be symmetrical with respect to the central through-hole 69a, and a pair of positioning pins 69c (see FIGS. 19 and 25) fixed to the grip-side pivot support plate 69 to be symmetrical with respect to the central through-hole 69a.

The pivot shaft 41 is three-layered, i.e., includes an outer cylinder (stationary cylinder/outside cylinder/first cylindrical member) 60, a middle cylinder (stationary barrel/inside cylinder/second cylindrical member) 61 and an inner cylinder (advancing/retreating lock control member) 62, which are mutually different in diameter and are concentrically arranged.

Figure 30:
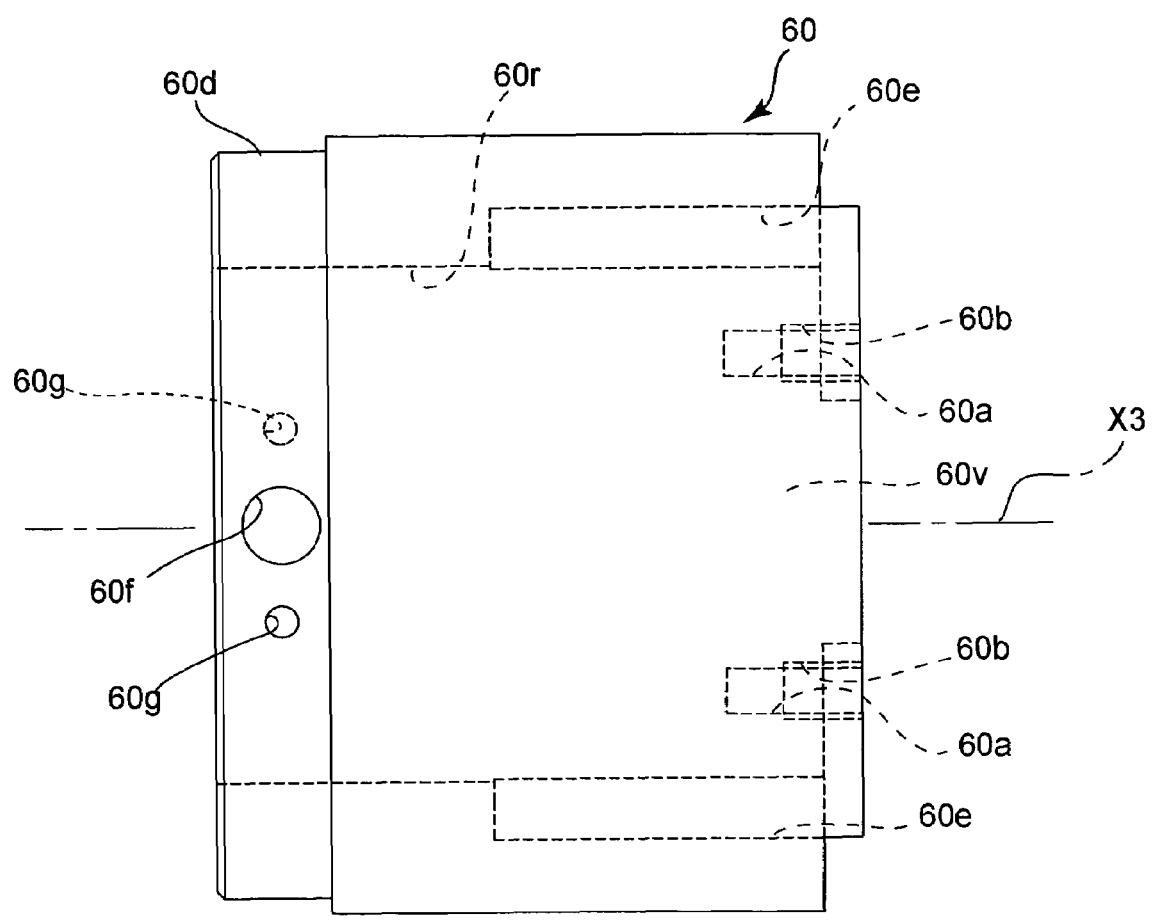
FIG. 30 is a side elevational view of the outer cylinder that serves as an element of the extendable pivot shaft.
Figure 31:
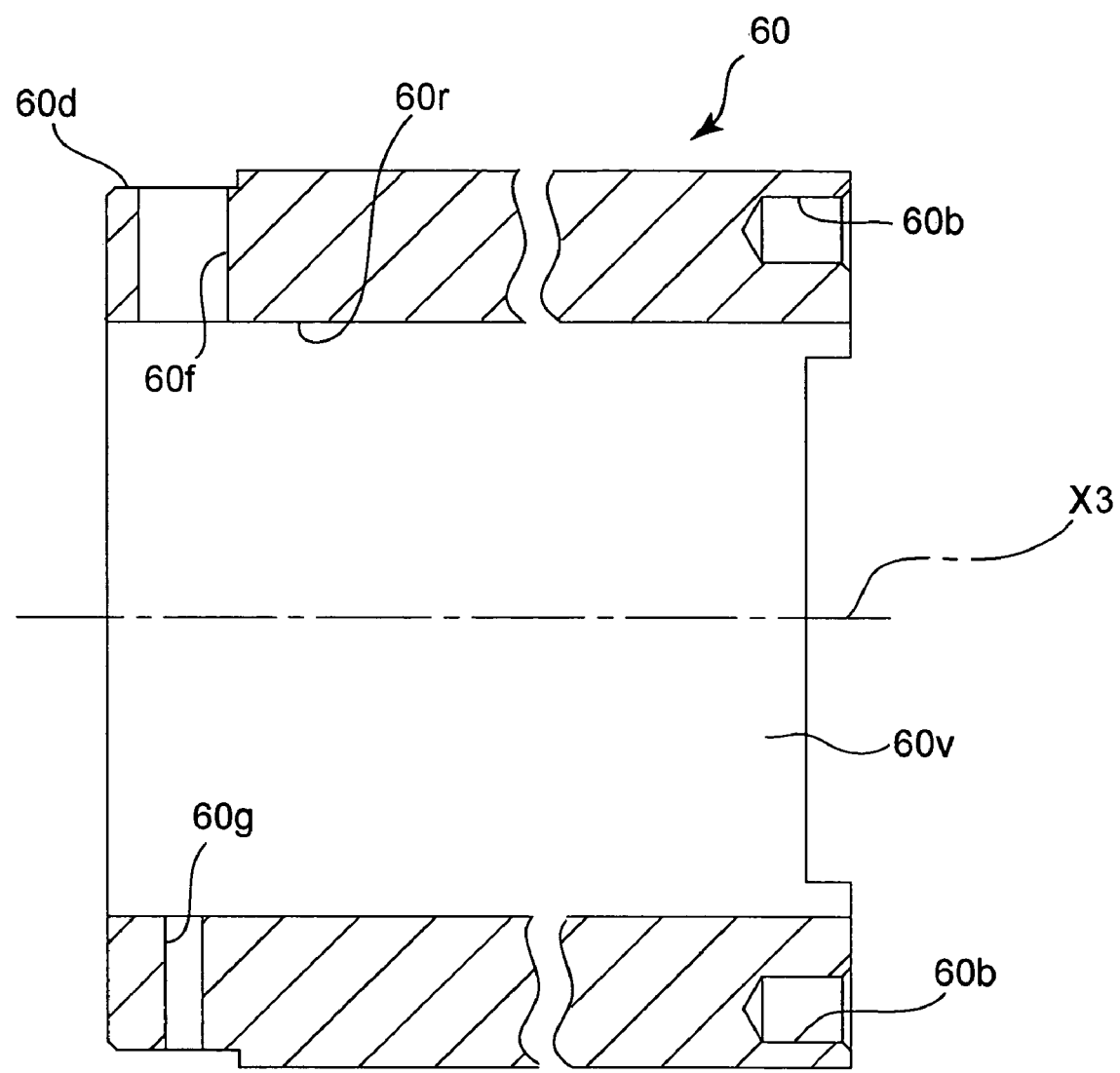
FIG. 31 is an axial cross sectional view of the outer cylinder, taken along the axis of the extendable pivot shaft of the grip.
Figure 32:
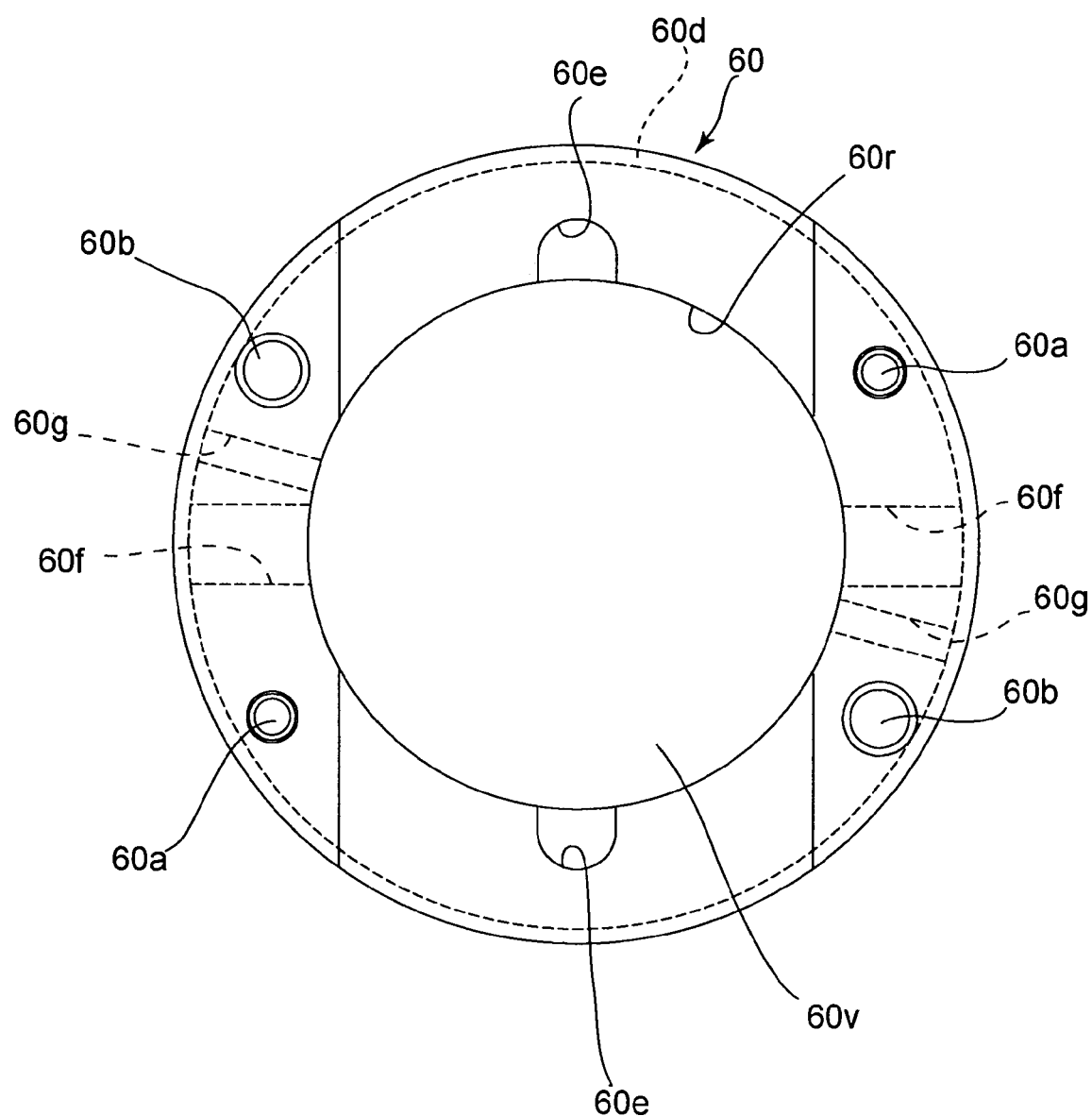
FIG. 32 is a front elevational view of a body-side end of the outer cylinder.

As shown in FIGS. 30 through 32, the outer cylinder 60 is a hollow cylindrical member having a through space 60v which extends along the axis X3. The outer cylinder 60 is provided, at positions thereon which respectively correspond to the pair of through-holes 64b of the body-side pivot support plate 64, with a pair of screw holes 60a. The outer cylinder 60 is further provided, at positions thereon which respectively correspond to the pair of positioning pins 64c of the body-side pivot support plate 64, with a pair of positioning holes 60b. The outer cylinder 60 is fixed to the body-side pivot support plate 64 by a pair of set screws 60c which are screwed into the pair of screw holes 60a through the pair of through-holes 64b, respectively (see FIG. 25). Thereupon, the pair of positioning pins 64c are engaged in the pair of positioning holes 60b to determine the positioning of the outer cylinder 60 with respect to the body-side pivot support plate 64 (see FIG. 20). The outer cylinder 60 is provided at the other end (hereinafter referred to as the grip-side end) with a ring-fitting portion 60d the outer diameter of which is smaller than that of the remaining portion of the outer cylinder 60. A holding ring 63 is fitted on the ring-fitting portion 60d.

Figure 28:
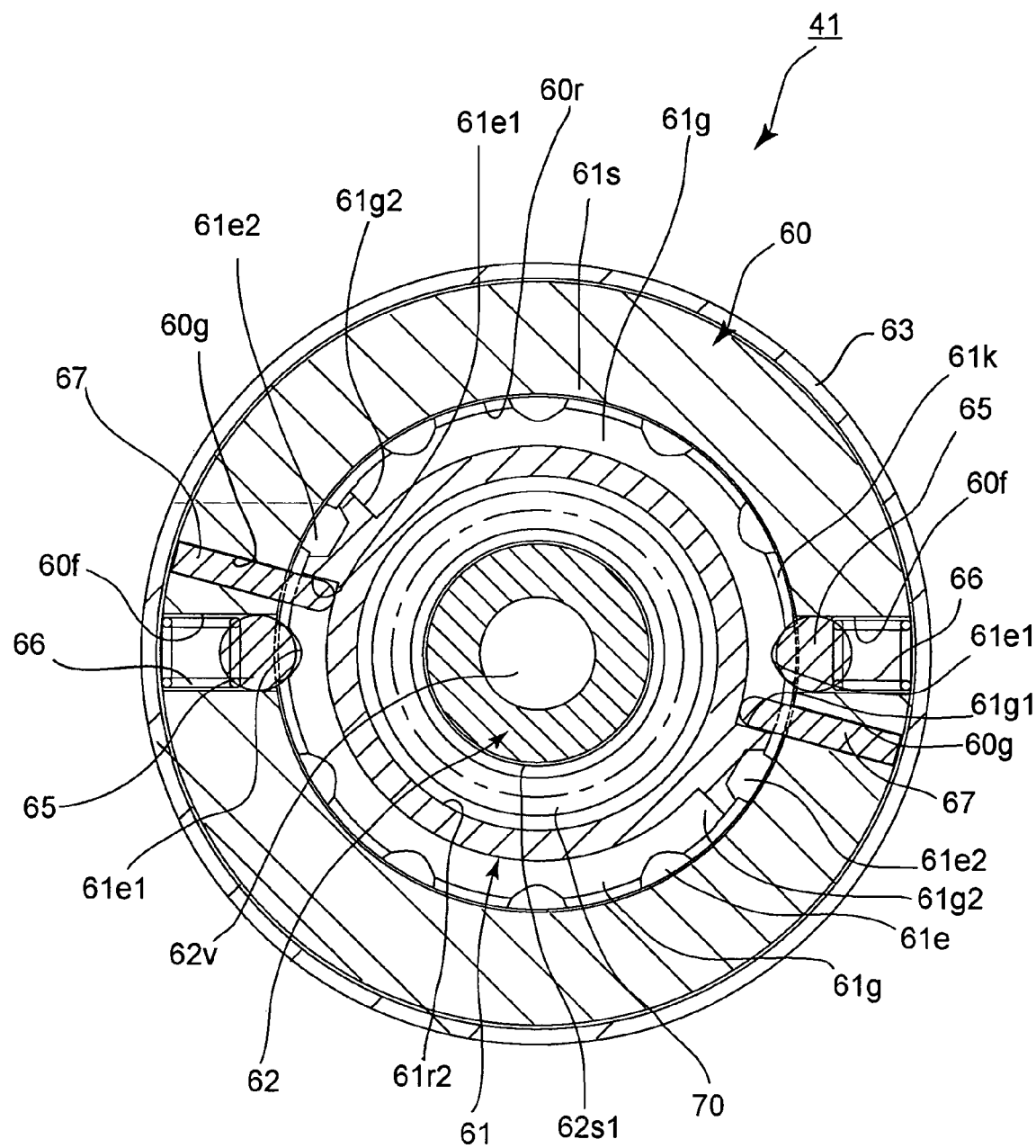
FIG. 28 is a cross sectional view of the extendable pivot shaft, taken along the XXVIII-XXVIII line shown in FIG. 24.

The outer cylinder 60 is provided with a cylindrical inner peripheral surface 60r, the axis thereof being common with the axis X3. The outer cylinder 60 is provided on the cylindrical inner peripheral surface 60r with a pair of linear guide grooves 60e which extend parallel to the axis X3, a pair of click-ball accommodation holes 60f and a pair of pin accommodation holes 60g. The pair of linear guide grooves 60e are positioned to be symmetrical with respect to the axis X3 (see FIG. 29). The pair of click-ball accommodation holes 60f are formed on the ring-fitting portion 60d to radially face each other, while the pair of pin accommodation holes 60g are also formed on the ring-fitting portion 60d to radially face each other. As shown in FIG. 28, a click ball (an element of a click-stop mechanism) 65 is accommodated in each click-ball accommodation hole 60f, and is biased radially inwards by an associated compression coil spring 66. A guide pin (an element of a second rotation locking mechanism/a guide projection) 67 is accommodated in each pin accommodation hole 60g so that a radially inner end of the guide pin 67 projects radially inwards from the inner peripheral surface 60r of the outer cylinder 60. Each of the pair of click-ball accommodation holes 60f and the pair of pin accommodation holes 60g is formed as a through-hole which extends in a radial direction of the outer cylinder 60 so that not only the radially inner end of each accommodation hole 60f and 60g is open on the inner peripheral surface 60r of the outer cylinder 60 but also the radially outer end of each accommodation hole 60f and 60g is open on an outer peripheral surface of the ring-fitting portion 60d. Therefore, each click ball 65 and each compression coil spring 66 can be installed in the associated click-ball accommodation hole 60f from the radially outer end opening thereof, while each guide pin 67 can be installed in the associated pin accommodation hole 60g from the radially outer end opening thereof. Upon installation, the radially outer end opening of each click-ball accommodation hole 60f and the radially outer end opening of each pin accommodation hole 60*g* are closed by fitting the holding ring 63 on the ring-fitting portion 60*d*, so that the inner peripheral surface of the holding ring 63 serves as a support portion (retaining portion) for supporting each compression coil spring 66 and each guide pin 67.

The middle cylinder 61 is inserted in the through space 60*v* of the outer cylinder 60. As shown in FIGS. 33 through 37, the middle cylinder 61 is a hollow cylindrical member having a through space 61*v* which extends along the axis X3, and is provided with a cylindrical outer peripheral surface 61*s* which is slidable on the inner peripheral surface 60*r* of the outer cylinder 60.

Figure 25:
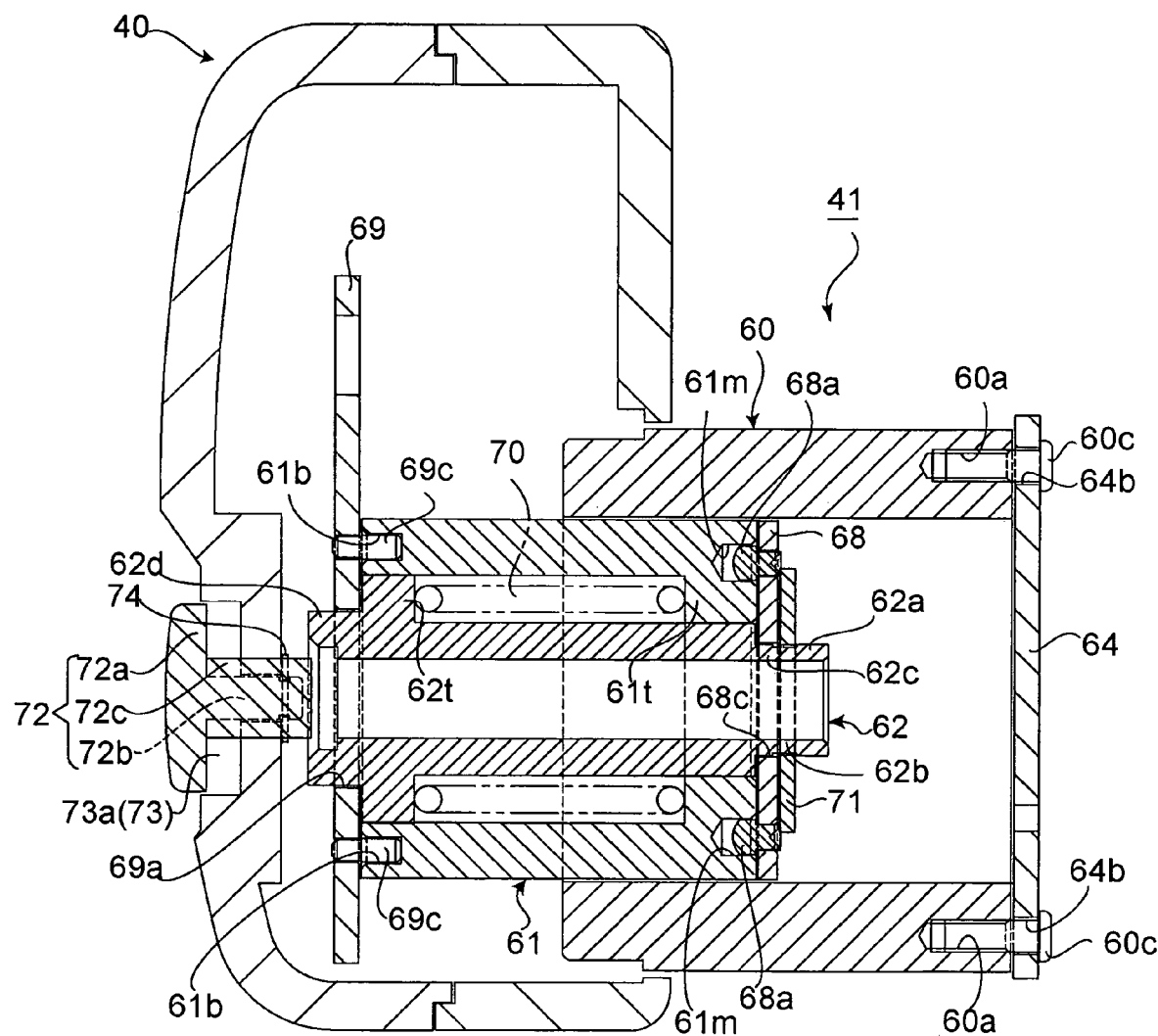
FIG. 25 is a view similar to that of FIG. 21, showing the portion of the grip shown in FIG. 21 when the grip is in the grip extended position.
Figure 37:
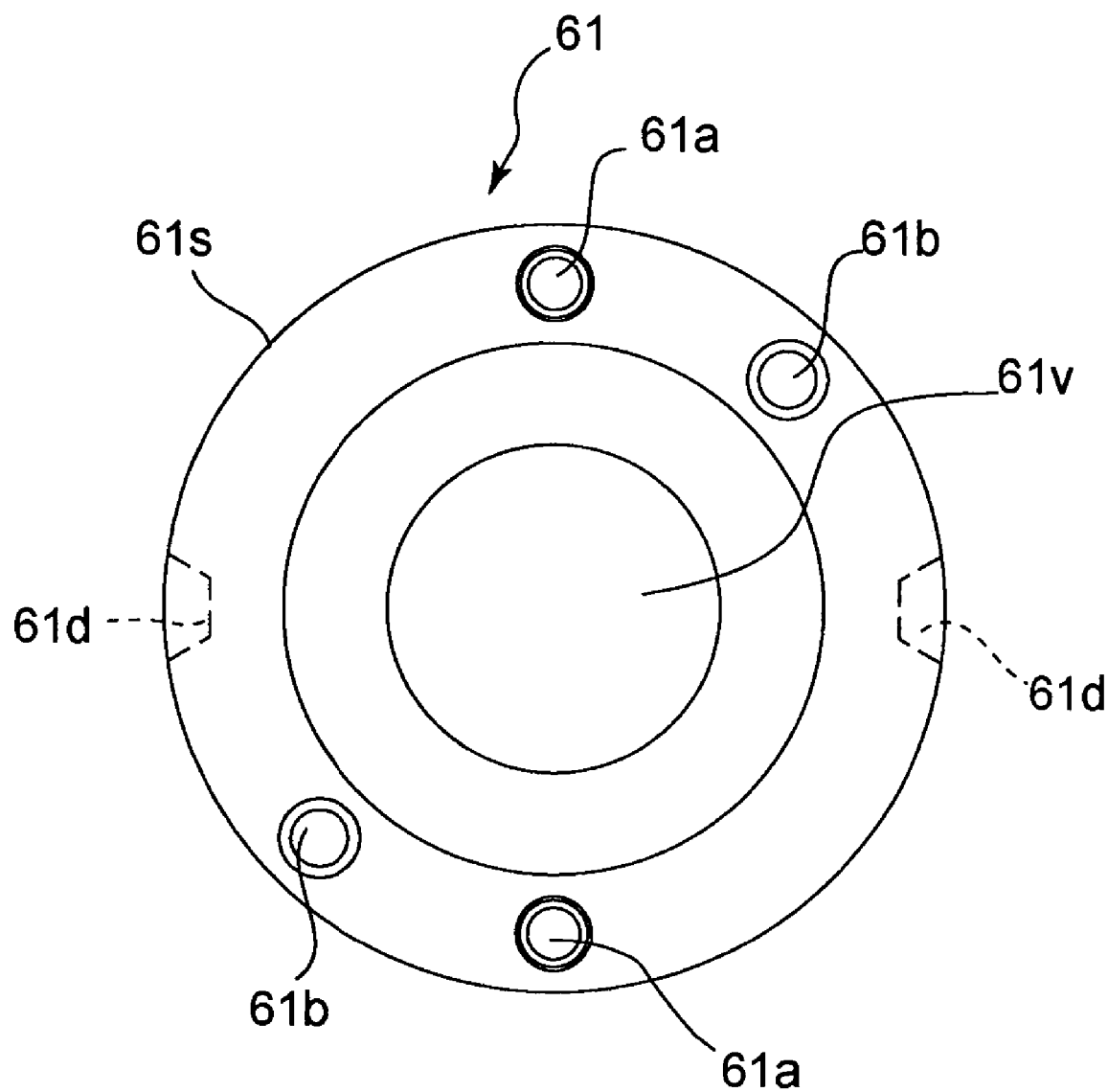
FIG. 37 is a front elevational view of a grip-side end of the middle cylinder.

The middle cylinder 61 is provided, on an end surface thereof at an end of the middle cylinder 61 which faces the grip-side pivot support plate 69 (hereinafter referred to as a grip-side end), with a pair of screw holes 61*a* and a pair of positioning holes 61*b* (see FIG. 37). The pair of positioning pins 69*c*, which are fixed to the grip-side pivot support plate 69 to project toward the middle cylinder 61, are engaged in the pair of positioning holes 61*b* of the middle cylinder 61, respectively (see FIG. 25). In a state where the pair of positioning pins 69*c* are respectively engaged in the pair of positioning holes 61*b* of the middle cylinder 61, as shown in FIG. 25, the pair of through-holes 69*b* are aligned with the pair of screw holes 61*a* in the direction of the axis X3 to be communicatively connected with the pair of screw holes 61*a*, respectively. In this state, two set screws 61*c* are screwed into the pair of screw holes 61*a* through the pair of through-holes 69*b*, respectively, to fix the grip-side end of the middle cylinder 61 to the grip-side pivot support plate 69. (see FIGS. 21, 23, 25 and 26).

Figure 33:
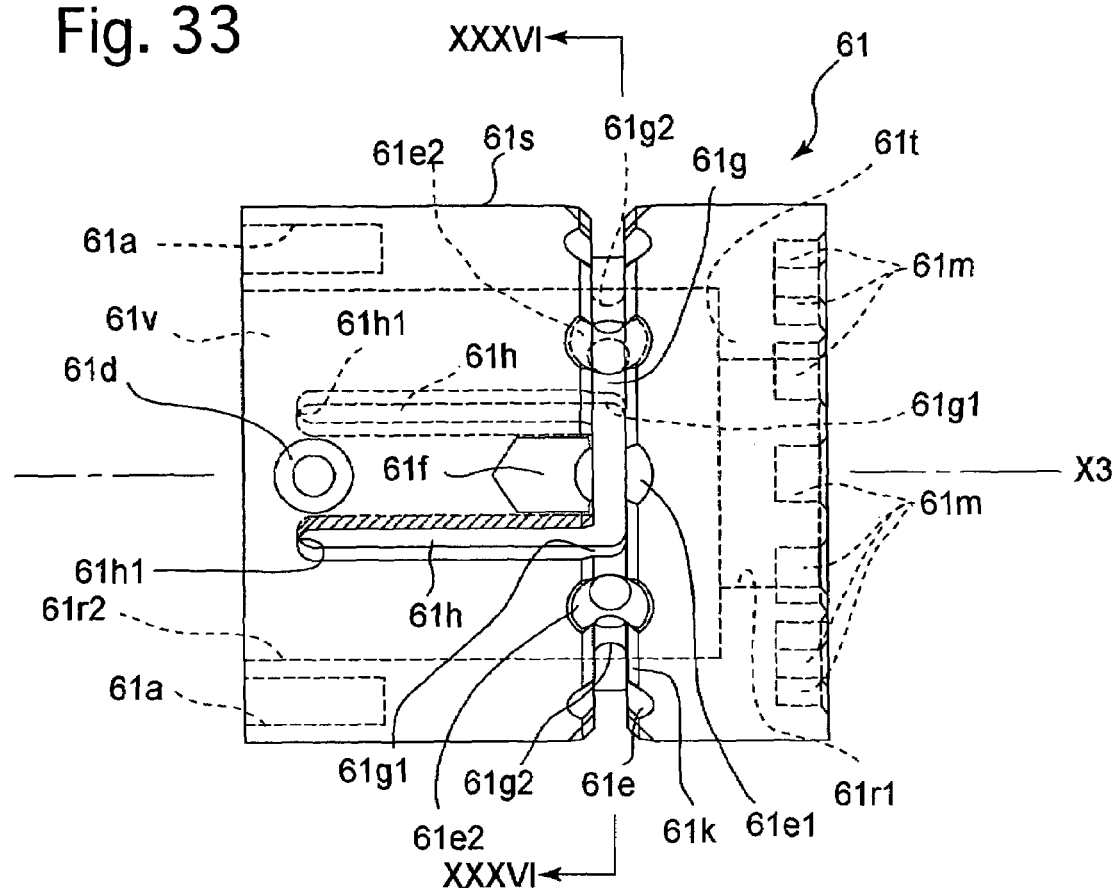
FIG. 33 is a side elevational view of the middle cylinder that serves as an element of the extendable pivot shaft.
Figure 34:
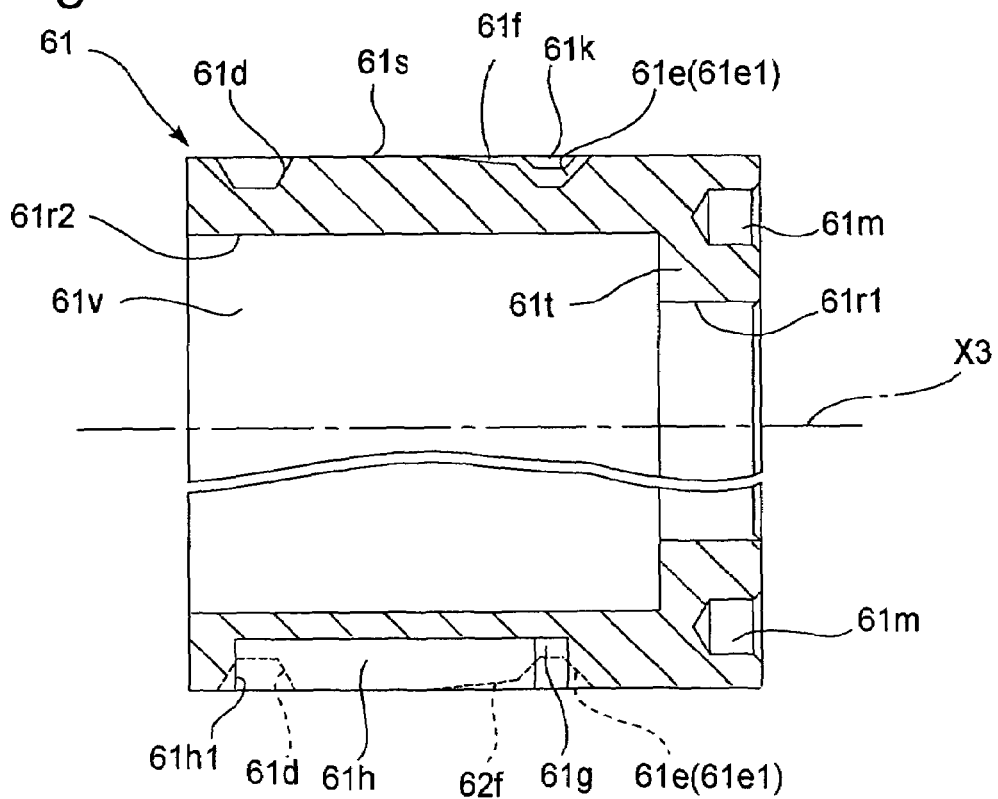
FIG. 34 is a cross sectional view of the middle cylinder, viewed along the axis of the extendable pivot shaft of the grip.
Figure 36:
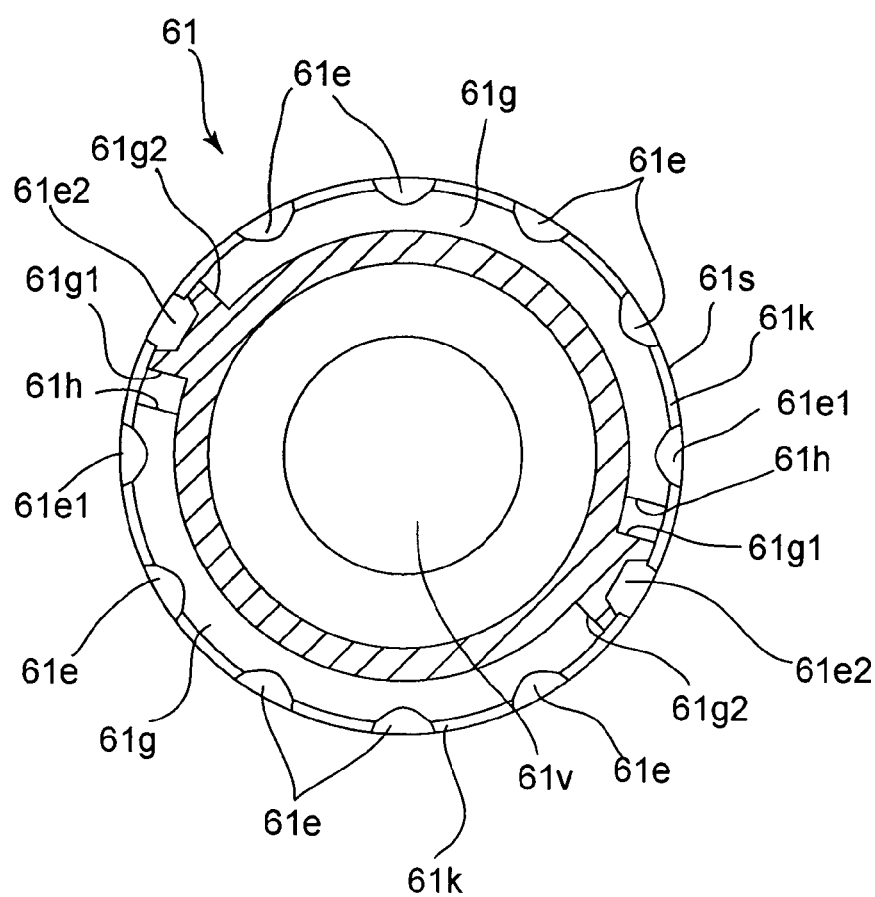
FIG. 36 is a cross sectional view of the middle cylinder, taken along XXXVI-XXXVI line shown in FIG. 33.

As shown in FIGS. 33, 34 and 36, the middle cylinder 61 is provided on the outer peripheral surface 61*s* with a pair of front click-ball engaging recesses (elements of the click-stop mechanism) 61*d* and twelve rear click-ball engaging recesses (elements of the click-stop mechanism) 61*e*. The twelve rear click-ball engaging recesses 61*e* are provided at substantially equi-angular intervals in a circumferential direction of the middle cylinder 61, and the middle cylinder 61 is provided on the outer peripheral surface 61*s* with a circumferential ball guide groove 61*k* by which the twelve rear click-ball engaging recesses 61*e* are communicatively connected with one another. Two of the twelve rear click-ball engaging recesses 61*e* which are aligned with the pair of front click-ball engaging recesses 61*d* in the direction of the axis X3 serve as a pair of rotation-origin recesses 61*e*1. The middle cylinder 61 is provided, on the outer peripheral surface 61*s* adjacent to the pair of rotation-origin recesses 61*e*1, with a pair of inclined recesses 61*f* which are communicatively connected to the pair of rotation-origin recesses 61*e*1, respectively. The depth (radial depth) of the button surface of each inclined recess 61*f* gradually decreases in a direction from the associated rotation-origin recess 61*e*1 toward the associated click-ball engaging recess 61*d* in the direction of the axis X3 (from right to left as viewed in FIG. 34). Two of the twelve rear click-ball engaging recesses 61*e*, i.e., rotation endpoint recesses 61*e*2, are positioned on circumferentially opposite sides of each of the pair of rotation-origin recesses 61*e*1 and are formed to be greater in depth (radial depth) than the remaining rear click-ball engaging recesses 61*e*. Each of the two click balls 65 can be engaged and disengaged in and from each of the pair of front click-ball engaging recess 61*d* and the twelve rear click-ball engaging recesses 61*e* (61*e*1 and 61*e*2).

The middle cylinder 61 is further provided on the outer peripheral surface 61*s* with a pair of rotation permitting grooves (elements of a second rotation locking mechanism/ circumferential grooves) 61*g* which extend in a circumferential direction of the middle cylinder 61, and a pair of rotation preventing grooves (elements of the second rotation locking mechanism/axial grooves) 61*h* parallel to the axis X3. Each rotation preventing groove 61*h* is positioned between one of the two rotation-origin recesses 61*e*1 and one of the two rotation endpoint recesses 61*e*2 in a circumferential direction of the middle cylinder 61, and one end (the right end as viewed in FIG. 33) of each rotation preventing groove 61*h* in the direction of the axis X3 is communicatively connected with the associated rotation permitting groove 61*g*, while the other end of each rotation preventing groove 61*h* in the direction of the axis X3 is closed to serve as a stop surface 61*h*1. The stop surfaces 61*h*1 of the pair of rotation preventing grooves 61*h* and the pair of front click-ball engaging recesses 61*d* are provided at substantially the same position with respect to the axis X3. The pair of rotation permitting grooves 61*g* are positioned on a substantially common circle about the axis X3. Each of the pair of rotation permitting grooves 61*g* is communicatively connected with the associated five of the twelve rear click-ball engaging recesses 61*e* except for the two rotation endpoint recesses 61*e*2 (see FIG. 36), and is also communicatively connected with a radially inner edge of the circumferential ball guide groove 61*k*. In other words, the circumferential ball guide groove 61*k* and the rear click-ball engaging recesses 61*e*, except for the two rotation endpoint recesses 61*e*2, are formed as a plurality of inclined surfaces which are formed on the outer peripheral surface 61*s* of the middle cylinder 61 on the opposite edges of the radially outer opening of each rotation permitting groove 61*g*. The middle cylinder 61 is provided, in each of the pair of rotation permitting grooves 61*g* at one end thereof adjoining the associated rotation preventing groove 61*h*, with a first stop surface 61*g*1, and is provided in each of the pair of rotation permitting grooves 61*g* at the other end thereof with a second stop surface 61*g*2. Each rotation permitting groove 61*g* extends circumferentially over approximately halfway around the outer peripheral surface 61*s*. More specifically, as shown in FIGS. 28 through 36, each rotation permitting groove 61*g* is formed on the outer peripheral surface 61*s* so as not to overlap either of the two rotation endpoint recesses 61*e*2. The pair of guide pins 67 can be selectively inserted in the pair of rotation preventing grooves 61*h* and the pair of rotation permitting grooves 61*g*, respectively. The pair of guide pins 67 are slidably movable in the direction of the axis X3 when engaged in the pair of rotation preventing grooves 61*h*, respectively, and are slidably guided in a circumferential direction of the middle cylinder 61 when engaged in the pair of rotation permitting grooves 61*g*, respectively.

Figure 35:
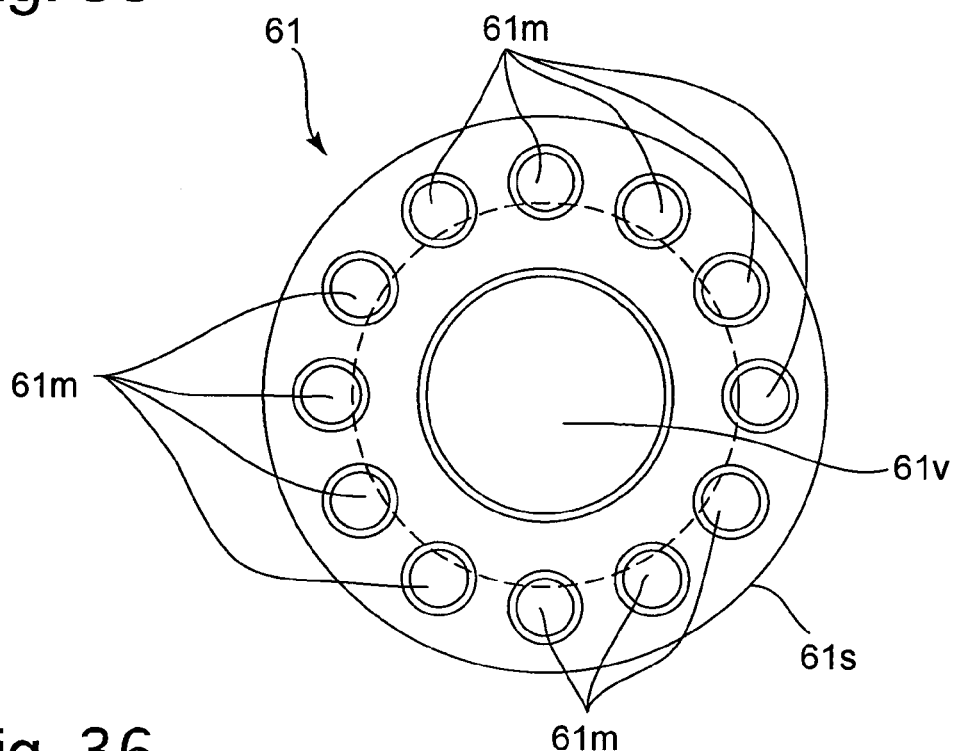
FIG. 35 is a front elevational view of a body-side end of the middle cylinder.

As shown in FIGS. 33 through 35, the middle cylinder 61 is provided, on an end surface thereof at an end of the middle cylinder 61 which faces the body-side pivot support plate 64 (hereinafter referred to as a body-side end) with twelve rotation lock holes (elements of the rotation locking mechanism/recesses) 61*m* which are provided at equi-angular intervals in a circumferential direction of the middle cylinder 61. The pivot shaft 41 is provided, between the body-side pivot support plate 64 and the end surface of the middle cylinder 61 at the body-side end thereof, with a rotation preventing plate (an element of the rotation locking mechanism) 68. A pair of rotation lock pins (projections) 68*a* (see FIGS. 18 and 19) which are fixed to the rotation preventing plate 68 can be selectively engaged and disengaged in and from the twelve rotation lock holes 61*m*. The pair of rotation lock pins 68a are positioned to be radially symmetrical with respect to the axis X3. In addition to the pair of rotation lock pins 68a, the rotation preventing plate 68 is provided with a pair of linear guide projections 68b which project radially outwards from the outer edge of the rotation preventing plate 68 in radially opposite directions away from each other to be slidably engaged in the pair of linear guide grooves 60e of the outer cylinder 60, respectively (see FIGS. 21, 26 and 29). Due to the engagement of the pair of linear guide projections 68b with the pair of linear guide grooves 60e, the rotation preventing plate 68 is linearly guided in the direction of the axis. X3 with respect to the outer cylinder 60 while being prevented from rotating with respect to the outer cylinder 60. In a state where the pair of rotation lock pins 68a are selectively engaged in the twelve rotation lock holes 61m, the middle cylinder 61 is prevented from rotating relative to the outer cylinder 60 via the rotation preventing plate 68.

The middle cylinder 61 is provided, on an inner peripheral surface thereof in the vicinity of the body-side end of the middle cylinder 61, with an annular flange (first spring contacting portion) 61t. The inner peripheral surface of the middle cylinder 61 includes a small-diameter inner peripheral surface 61r1 on the inner peripheral surface of the annular flange 61t, and a large-diameter inner peripheral surface 61r2 having a greater diameter than the small-diameter inner peripheral surface 61r1 (see FIG. 34). The small-diameter inner peripheral surface 61r1 and the large-diameter inner peripheral surface 61r2 are cylindrical surfaces concentrically arranged about the axis X3.

Figure 39:
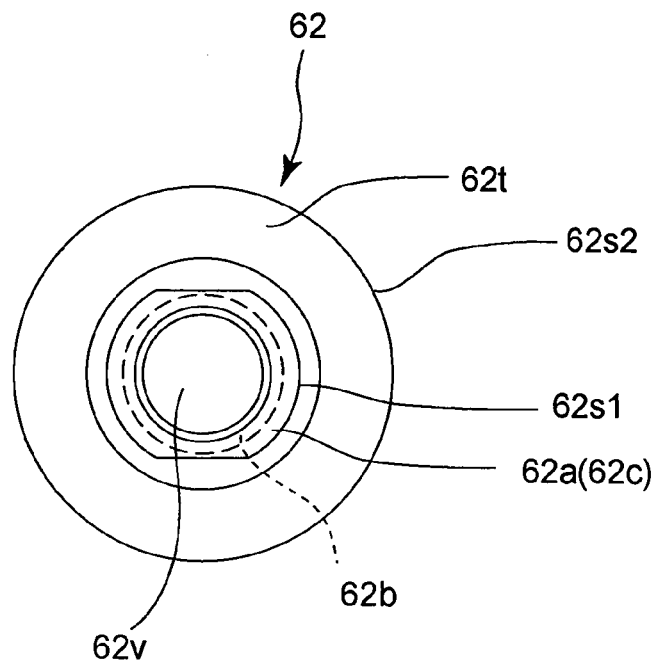
FIG. 39 is a front elevational view of a body-side end of the inner cylinder.
Figure 38:
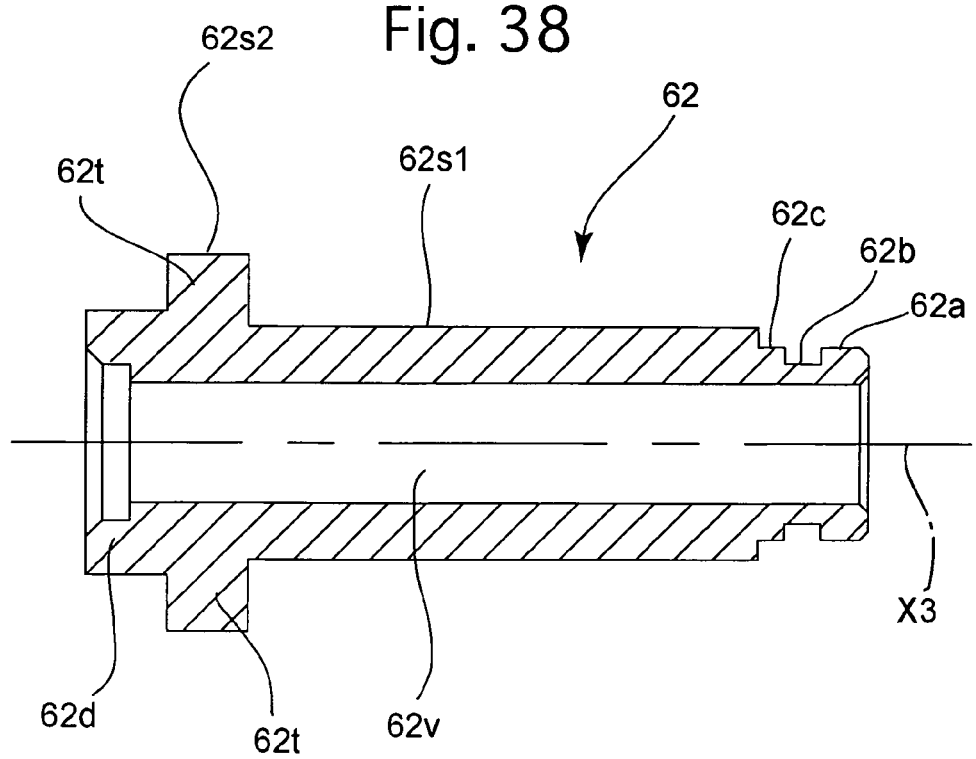
FIG. 38 is a cross sectional view of the inner cylinder, viewed along the axis of the extendable pivot shaft of the grip.

The inner cylinder 62 is inserted into the through space 61v of the middle cylinder 61. As shown in FIGS. 38 and 39, the inner cylinder 62 is a hollow cylindrical member having a through space 62v which extends along the axis X3. The inner cylinder 62 is provided with a hollow shaft portion having a small-diameter outer peripheral surface 62s1, and an annular flange (second spring contacting portion) 62t having a large-diameter outer peripheral surface 62s2. The small-diameter outer peripheral surface 62s1 and the large-diameter outer peripheral surface 62s2 are concentrically arranged about the axis X3 to be in slidable contact with the small-diameter inner peripheral surface 61r1 and the large-diameter inner peripheral surface 61r2, respectively. Due to this slidable engagement of the small-diameter outer peripheral surface 62s1 and the large-diameter outer peripheral surface 62s2 with the small-diameter inner peripheral surface 61r1 and the large-diameter inner peripheral surface 61r2, respectively, the inner cylinder 62 is supported by the middle cylinder 61 to be capable of both rotating about the axis X3 and moving along the axis X3 relative to the middle cylinder 61. The middle cylinder 61 and the inner cylinder 62 are biased in opposite directions away from each other by a compression coil spring (lock biasing device) 70 installed between the annular flange 61t of the middle cylinder 61 and the annular flange 62t of the inner cylinder 62 to move the annular flange 61t and the annular flange 62t away from each other (see FIGS. 20, 21, 23 through 26).

The grip 40 is provided therein with a switch substrate (not shown) for the release button 45, the zoom switch 46 and the moving-image recording button 47, and electrical contacts (not shown) for the battery pack 42. Electrical wiring (not shown; e.g., a bundle of lead wires) for electrically connecting each of the switch substrate and the electrical contacts with the main switch 58 is installed so as to pass through the through space 62v.

Figure 24:
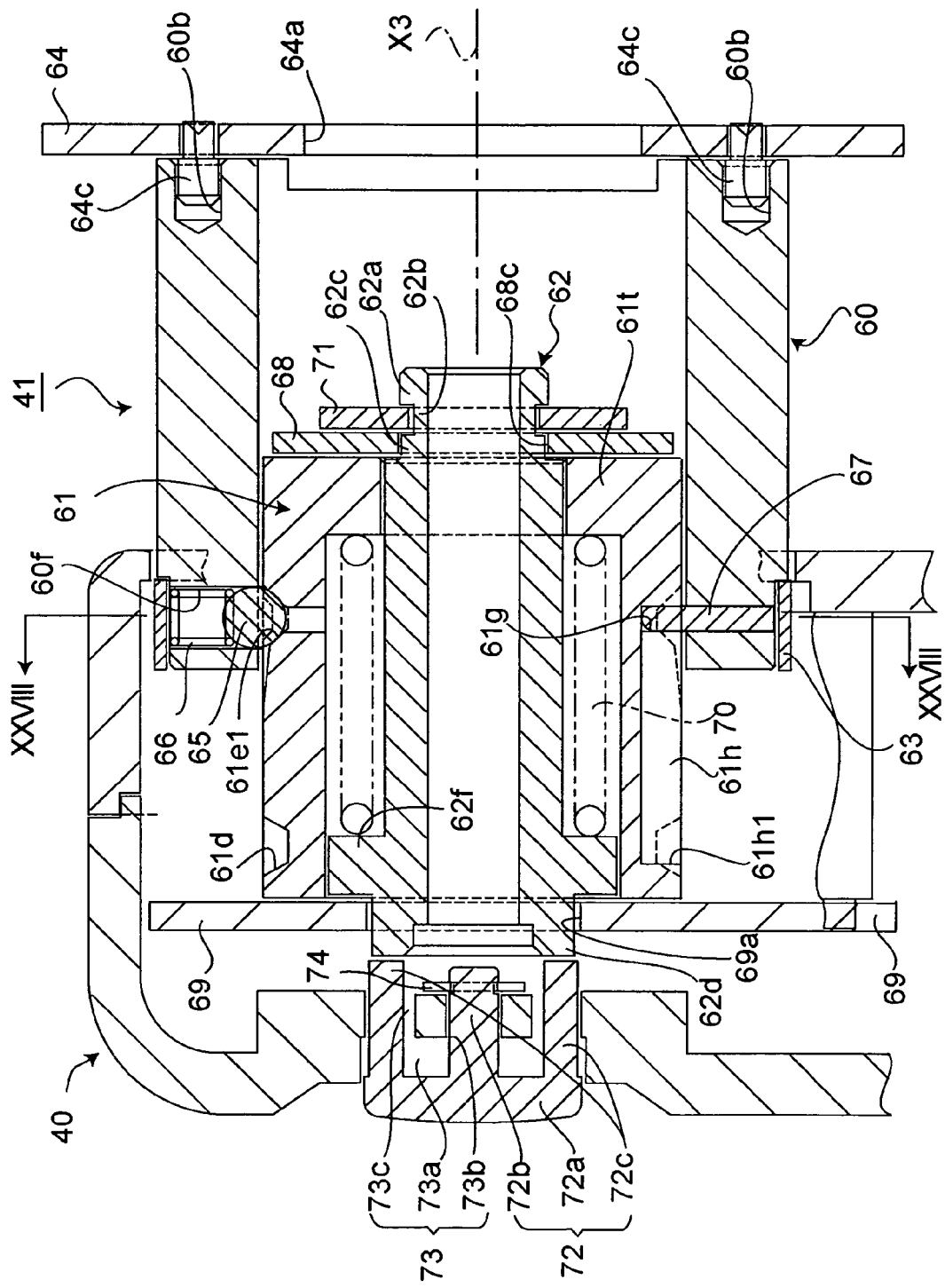
FIG. 24 is a view similar to that of FIG. 20, showing the portion of the grip shown in FIG. 20 when the grip is in a grip extended position.
Figure 29:
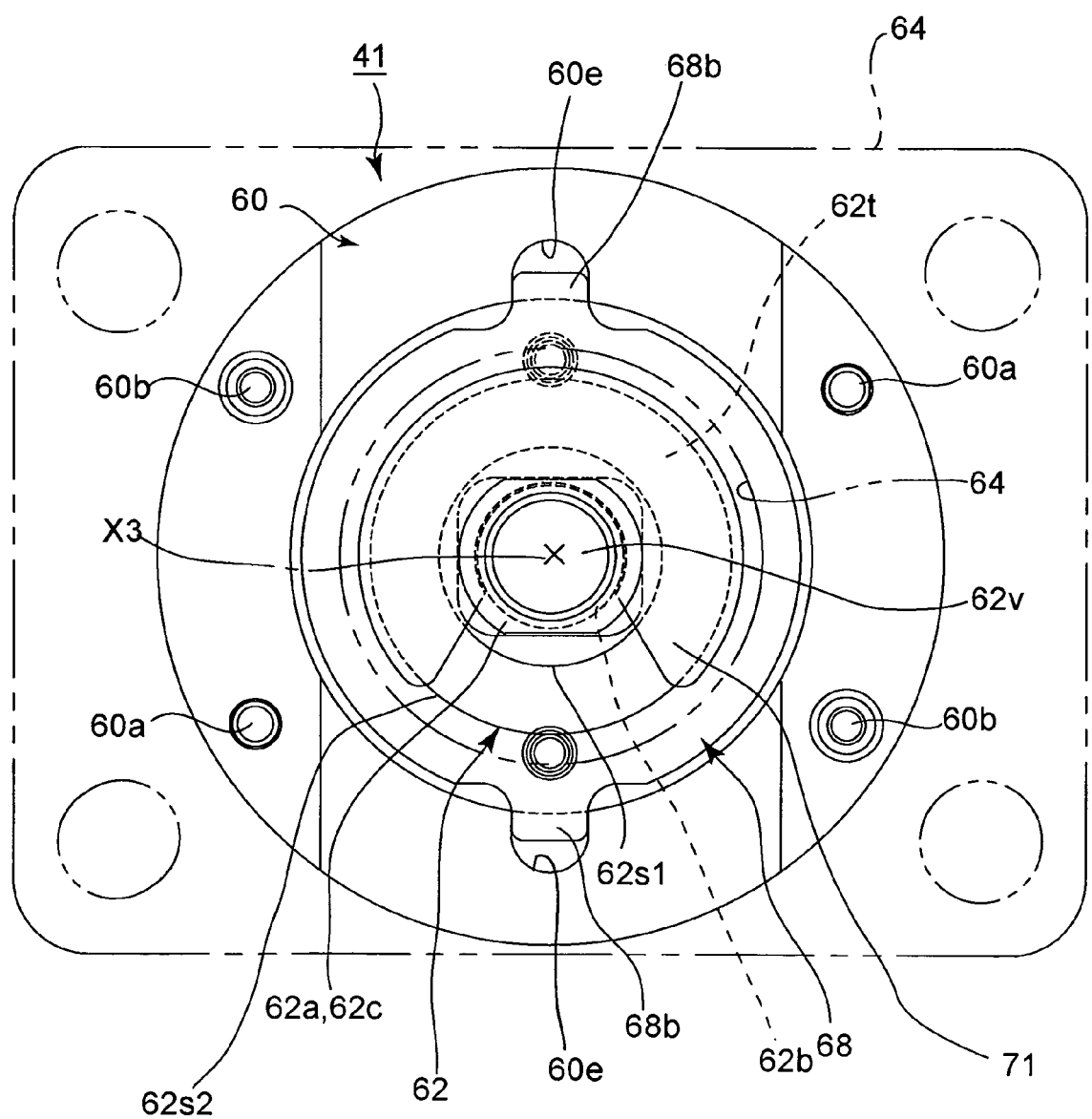
FIG. 29 is a front elevational view of a body-side end of the extendable pivot shaft with the middle cylinder removed for clarity.

The inner cylinder 62 is provided, at one end thereof on the body-side pivot support plate 64 side (hereinafter referred to as a body-side end), with a retaining portion 62a, a first engaging portion 62b and a second engaging portion 62c, in that order from the body-side of the inner cylinder 62. As shown in FIGS. 29 and 39, the outer peripheral surfaces of the retaining portion 62a and the second engaging portion 62c have the same shape and diameter. Each of the retaining portion 62a and the second engaging portion 62c is provided with a pair of flat portions, and hence, is noncircular in cross section (see FIG. 39). On the other hand, the first engaging portion 62b is circular and smaller in diameter than the retaining portion 62a and the second engaging portion 62c. The rotation preventing plate 68 is provided at a center thereof with a noncircular through-hole 68c in which the retaining portion 62a and the second engaging portion 62c can be inserted. A snap ring (C-shaped ring) 71 can be snapped onto the first engaging portion 62b. As shown in FIGS. 20 and 24, upon being snapped onto the first engaging portion 62b, the snap ring 71 is prevented from coming off the first engaging portion 62b of the inner cylinder 62 to thereby prevent the rotation preventing plate 68 from coming off the inner cylinder 62. In this state, due to the engagement between the second engaging portion 62c and the noncircular through-hole 68c that are noncircular in cross section, the inner cylinder 62 and the rotation preventing plate 68 are prevented from rotating relative to each other. In other words, the inner cylinder 62 and the rotation preventing plate 68 are joined to each other to be substantially integral with each other.

The inner cylinder 62 is provided, at one end thereof on the grip-side pivot support plate 69 side, with an annular pressed portion 62d having a center on the axis X3. The pressed portion 62d is fitted in the central through-hole 69a of the grip-side pivot support plate 69 to be movable in the direction of the axis X3 relative to the grip-side pivot support plate 69.

The grip 40 is provided at a position thereon which faces the pressed portion 62d with a rotation-lock release button (unlocking manual operation member) 72. The grip 40 is provided on the longitudinal side surface 40e with a button support hole 73 which extends through the wall of the grip 40, while the rotation-lock release button 72 is inserted into the button support hole 73 to be supported thereby to be movable along the axis X3. More specifically, the button support hole 73 is provided with a circular bottomed portion 73a which is open on the longitudinal side surface 40e, and three through-holes through which the bottom of the button support hole 73 and the inside of the grip 40 are communicatively connected with each other. These three through-holes are composed of a circular through-hole 73b provided at a substantially axial center of the circular bottomed portion 73a, and a pair of non-circular through-holes 73c provided on radially opposite sides of the circular through-hole 73b (see FIG. 27). The rotation-lock release button 72 is provided with a push operation portion 72a, a retaining shaft portion 72b and a pair of pressure projections 72c. The push operation portion 72a is supported inside of the circular bottomed portion 73a, and is exposed to the outside of the grip 40, the retaining shaft portion 72b projects into the grip 40 from the push operation portion 72a, and the pair of pressure projections 72c. The retaining shaft portion 72b is inserted into the circular through-hole 73b, while the pair of pressure projections 72c are inserted into the pair of non-circular through-holes 73c, respectively. A snap ring (C-shaped ring) 74 which is greater in diameter than the circular through-hole 73b is fixed on the retaining shaft portion 72b in the vicinity of the tip thereof to prevent the rotation-lock release button 72 from coming off the grip 40. The ends of the pair of pressure projections 72c are in contact with the annular pressed portion 62d. Accordingly, pressing the push operation portion 72a into the grip 40 causes the rotation-lock release button 72 to move into the grip 40 along the axis X3 so that the pair of pressure projections 72c press the pressed portion 62d of the inner cylinder 62.

The structure of the pivot shaft 41 is such that the outer cylinder 60 is fixed to the body-side pivot support plate 64 on the camera body 11 side while the middle cylinder 61 is fixed to the grip-side pivot support plate 69 on the grip 40 side, and that the inner cylinder 62 and the rotation preventing plate 68 are integrally joined to each other to be movable along the axis X3 in accordance with an operation of the rotation-lock release button 72.

Operations of the grip shaft 41, i.e., operations of the present embodiment of the grip shaft mechanism, will be discussed thereinafter. FIGS. 20 through 22 show cross sectional views, taken at different circumferential positions, of the internal structure of the grip shaft 41 when the rotation-lock release button 72 is not pressed in a grip-shaft contracted state shown in FIGS. 1 and 11. In this state, the axial length of the grip shaft 41 is minimum, and the grip-side end of the outer cylinder 60 is positioned in the vicinity of the grip-side pivot support plate 69. In this positional relationship between the outer cylinder 60 and the middle cylinder 61, the pair of click balls 65 are engaged in the pair of front click-ball engaging recesses 61d, respectively, while the pair of guide pins 67 that are engaged in the pair of rotation preventing grooves 61h are positioned in close vicinity of the stop surfaces 61h1 thereof. In addition, the inner cylinder 62 is biased toward the grip-side pivot support plate 69 by the spring force of the compression coil spring 70 so that the annular flange 62t is in contact with the grip-side pivot support plate 69 while the rotation preventing plate 68 that is integral with the inner cylinder 62 is in contact with the body-side of the middle cylinder 61 to thereby determine the limit of movement of the inner cylinder 62 in a biasing direction thereof by the compression coil spring 70. Note that only the engagement of the annular flange 62t with the grip-side pivot support plate 69 or only the engagement of the rotation preventing plate 68 with the middle cylinder 61 is necessary for determining the limit of movement of the inner cylinder 62 in a biasing direction thereof by the compression coil spring 70. Accordingly, the body-side end of the inner cylinder 62 (the stop flange 62a) enters into the central circular through-hole 64a of the body-side pivot support plate 64, and also the pressed portion 62d of the inner cylinder 62 that is positioned on the grip-side end thereof presses the rotation-lock release button 72 toward the external surface of the grip 40 by the spring force of the compression coil spring 70 so that the push operation portion 72a of the rotation-lock release button 72 moves away the bottom of the circular bottomed portion 73a.

Additionally, in the grip-shaft contracted state, the pair of rotation lock pins 68a of the rotation preventing plate 68 are engaged in corresponding two of the twelve rotation lock holes 61m of the middle cylinder 61, respectively, to prevent the middle cylinder 61 and the inner cylinder 62 from rotating relative to each other. Due to the engagement of the pair of linear guide projections 68b with the pair of linear guide grooves 60e, the rotation preventing plate 68 is prevented from rotating relative to the outer cylinder 60, which is a stationary element fixed to the camera body 11, and consequently, the grip 40 is prevented from rotating relative to the camera body 11. This state where the grip 40 is prevented from rotating relative to the camera body 11 is maintained by the spring force of the compression coil spring 70.

Figure 26:
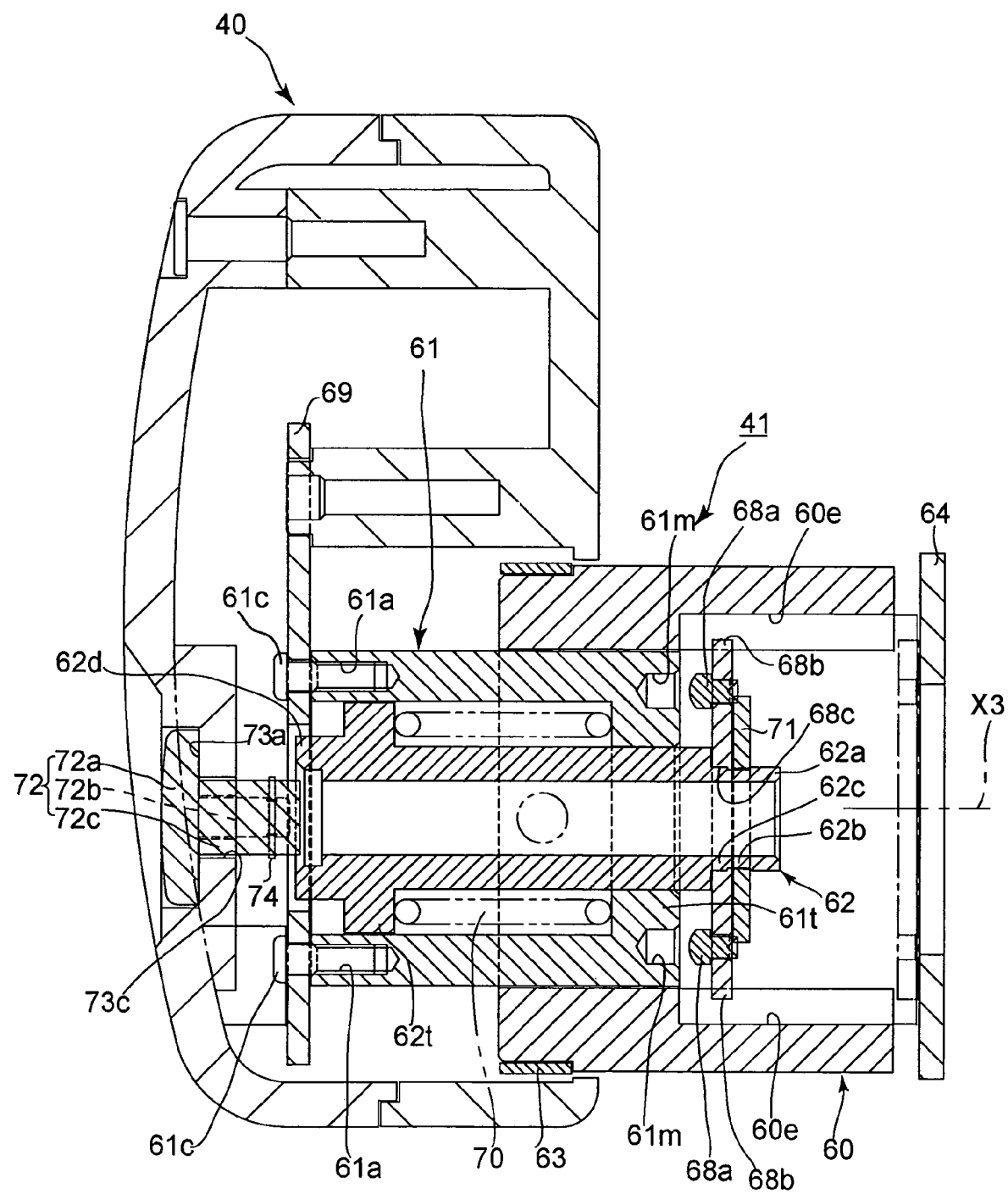
FIG. 26 is a view similar to that of FIG. 25, showing a state in which the rotation-lock release button is pressed when the grip is in the grip extended position.
Figure 27:
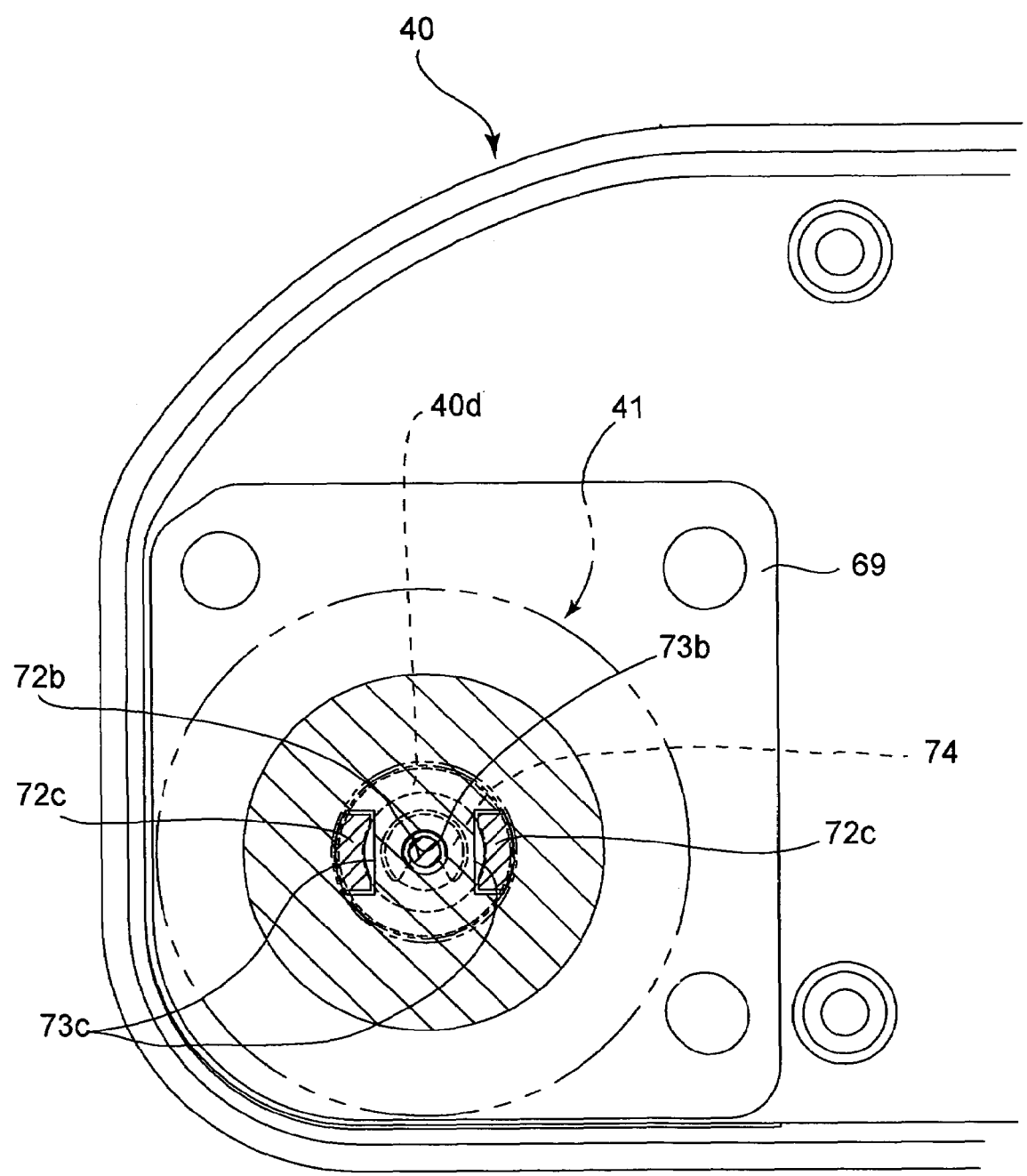
FIG. 27 is a cross sectional view taken along the XXVII-XXVII line shown in FIG. 20, showing a portion of the rotation-lock release button.

In the grip-shaft contracted state shown in FIGS. 1, 11, 20 through 22, pulling the grip 40 to a jutted position from the camera body 11 along the axis X3 causes the grip shaft 41 to change from the grip-shaft contracted state to a grip-shaft extended state shown in FIGS. 12, 24 and 25. FIGS. 24 and 26 show cross sectional views, taken at different circumferential positions (which correspond to those shown in FIGS. 21 and 22, respectively) of the internal structure of the grip shaft 41 in the grip-shaft extended state. Operations of the grip shaft 41 when pulled along the axis X3 thereof so as to jut from the camera body 11 will be discussed thereinafter.

Pulling the grip 40 along the axis X3 (i.e., a pulling direction) so as to jut from the camera body 11 causes the middle cylinder 61 to move in the same pulling direction parallel to the axis X3. This pulling direction corresponds to the leftward direction as viewed in FIGS. 20 through 22. Thereupon, the pair of click balls 65 are disengaged from the pair of front click-ball engaging recesses 61d, respectively, so that the middle cylinder 61 moves in a direction to project from the outer cylinder 60 while making the pair of click balls 65 rolling on the outer peripheral surface 61s of the middle cylinder 61. During this movement of the middle cylinder 61, the middle cylinder 61 remains prevented from rotating via the rotation preventing plate 68, and linearly moves along the axis X3 (the middle cylinder 61 is prevented from rotating relative to the outer cylinder 60) because of the engagement of the pair of guide pins 67 with the pair of rotation preventing grooves 61h. Upon the middle cylinder 61 being drawn from the outer cylinder 60 by a predetermined amount, the pair of click balls 65 enter the pair of inclined recesses 61f, and a further movement of the middle cylinder 61 in the same direction relative to the outer cylinder 60 causes the pair of click balls 65 to be led smoothly to the pair of rotation-origin recesses 61e1, via the pair of bottom-inclined recesses 61f, to be engaged in the pair of rotation-origin recesses 61e1, respectively (see FIG. 24). At the same time, during this movement of the middle cylinder 61, the pair of guide pins 67 move along the pair of rotation preventing grooves 61h, and enter the pair of rotation permitting grooves 61g upon the middle cylinder 61 moving to the position thereof shown in FIG. 24 (i.e., upon the pair of clicks balls 65 engaging in the pair of rotation-origin recesses 61e1). However, when the middle cylinder 61 linearly moves along the axis X3 relative to the outer cylinder 60, the inner cylinder 62 moves in the same direction via the compression coil spring 70, and the pair of rotation lock pins 68a fixed to the rotation preventing plate 68 remain engaged in two of the twelve rotation lock holes 61m as shown in FIG. 25. Therefore, in the state shown in FIG. 24, the prevention of the pair of rotation preventing grooves 61h from rotating relative to the pair of guide pins 67 is released though the engagement of the pair of rotation lock pins 68a with two of the twelve rotation lock holes 61m remains, and accordingly, the middle cylinder 61 remains to be prevented from rotating.

In order to rotate the grip 40 relative to the camera body 11, the rotation-lock release button 72 needs to be pressed into the grip 40 as shown in FIG. 26. Pushing the grip 40 into the camera body 11 causes the inner cylinder 62 to be pushed toward the body-side pivot support plate 64 against the spring force of the compression coil spring 70 via the pair of pressure projections 72c and the pressed portion 62d of the inner cylinder 62. If the rotation-lock release button 72 is pressed to a position where the push operation portion 72a comes in contact with the bottom of the button support hole 73, the rotation preventing plate 68 which is moved together with the inner cylinder 62 along the axis X3 moves away from the body-side end of the middle cylinder 61 to thereby cause the pair of rotation lock pins 68a to be disengaged from the twelve rotation lock holes 61m. This disengagement of the pair of rotation lock pins 68a from the twelve rotation lock holes 61m releases the prevention of the middle cylinder 61 from rotating relative to the outer cylinder 60 and the inner cylinder 62, thus allowing the grip 40 to rotate relative to the camera body 11.

A rotation of the grip 40 causes the pair of guide pins 67 to move in the pair of rotation permitting grooves 61g. More specifically, when the grip 40 has been fully pulled away from the camera body 11, each guide pin 67 is positioned in close vicinity of the first stop surface 61g1 of the associated rotation permitting groove 61g. In this state, the grip 40 is positioned in the angular position (retracted position) shown in FIG. 4, in which the grip end surface 40a of the grip 40 faces toward the front of the digital camera 10. The grip 40 is prevented from rotating counterclockwise as viewed in FIG. 4 by the engagement of each guide pin 67 with the first stop surface 61g1 of the associated rotation permitting groove 61g. On the other hand, the grip 40 can be rotated clockwise with respect to FIG. 4 from the angular position thereof, and rotating the grip 40 clockwise causes each pin 67 in the associated rotation permitting groove 61g to move away from the first stop surface 61g1 thereof in a direction to approach the second stop surface 61g2 of the associated rotation permitting groove 61g. Subsequently, in accordance with the clockwise rotation of the grip 40, each click ball 65 is disengaged from the associated rotation-origin recess 61e1, and subsequently moves in the circumferential ball guide groove 61k therealong in a direction toward the adjacent rear click-ball engaging recess 61e which is positioned on the circumferentially opposite side of the associated rotation-origin recess 61e1 from the rotation endpoint recess 61e2 adjacent to the associated rotation-origin recess 61e1. A click can be felt upon each click ball 65 being engaged in an adjacent rear click-ball engaging recess 61e, and a further rotation of the grip 40 causes each click ball 65 to be engaged and disengaged in and from the associated rear click-ball engaging recesses 61e one after another.

The grip 40 can be rotated up to a rotational position thereof in which a further movement of each of the pair of guide pins 67 is prevented by the second stop surface 61g2 of the associated rotation permitting groove 61g. Upon each guide pin 67 being positioned closely to the second stop surface 61g2 of the associated rotation permitting groove 61g, the pair of click balls 65 are engaged in the two rotation endpoint recesses 61e2, respectively. FIG. 5 shows this state, in which the grip 40 is in the rearward-extending position. The grip 40 can rotate about the axis X3 relative to the camera body 11 in a range of approximately 150 degrees while being guided by the pair of guide pins 67 and the pair of rotation permitting grooves 61g.

Figure 7:
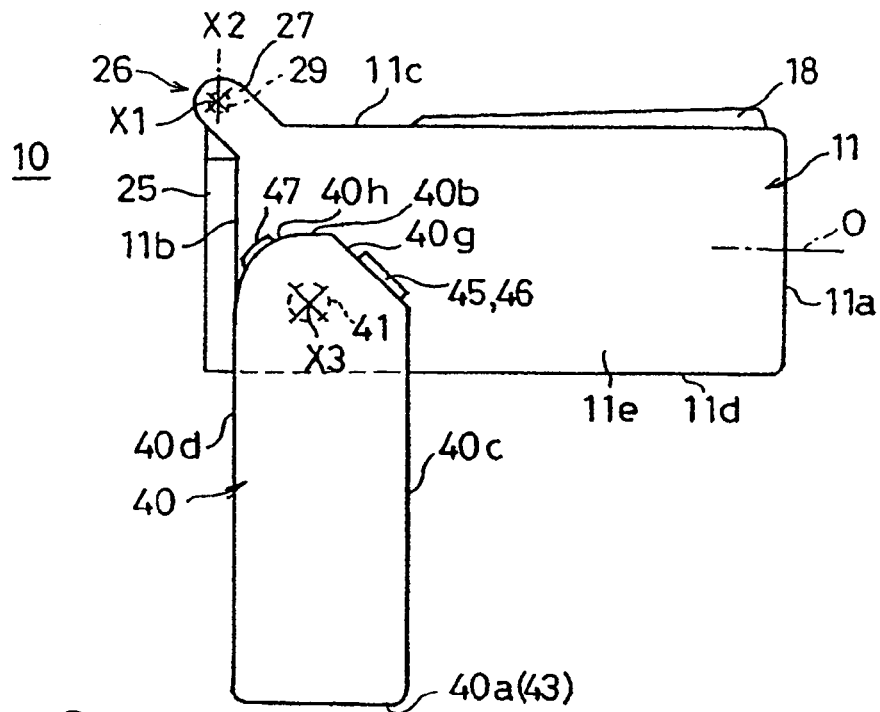
FIG. 7 is a side elevational view of the digital camera shown in FIGS. 1 and 2, showing a state in which the grip is rotated to extend downwards from the camera body.

Upon the user releasing pressure on the rotation-lock release button 72 at a desired angular position between the angular position shown in FIG. 4 and the angular position shown in FIG. 5, the inner cylinder 62 moves leftward as viewed in FIG. 26 by the spring force of the compression coil spring 70. This causes the pair of rotation lock pins 68a to be re-engaged in two of the twelve rotation lock holes 61m to thereby prevent the grip 40 from rotating. Since a plurality of rotation lock holes 61m are formed in a circumferential direction of the middle cylinder 61, the grip 40 can be click-stopped at predetermined different angular positions by changing the selection of the rotation lock holes 61m in which the pair of rotation lock pins 68a are engaged. More specifically, the grip 40 can be stopped with a click at six different angular positions (i.e., the retracted position shown in FIG. 4, the rearward-extending position shown in FIG. 5, and four intermediate angular positions between the retracted position and the rearward-extending position) since the twelve rotation lock holes 61m in total are formed for the pair of rotation lock pins 68a. FIGS. 6 and 7 show the grip 40 stopped at two of the four intermediate angular positions. In the grip shaft 41, the twelve rotation lock holes 61m, in which the pair of rotation lock pins 68a are selectively engaged, and the twelve rear click-ball engaging recesses 61e, in which the pair of click balls 65 are selectively engaged, are aligned at the same angular positions about the axis x3, and accordingly, each rotation lock pin 68a is engaged in an axially-opposed one of the twelve rotation lock holes 61m without interfering with an end surface of middle cylinder 61 at the body-side end thereof if the rotation-lock release button 72 is released at the time a click which occurs by engagement of each click ball 65 in one rear click-ball engaging recess 61e is felt. Accordingly, it is not necessary to conduct a fine adjustment to the angular position of the grip 40 to find an angular position of the grip 40 in which the pair of rotation lock pins 68a can be engaged in two of the twelve rotation lock holes 61m, which improves the ease of operability of the grip 40.

When the grip 40 is retracted, operations of the grip shaft 41 from the above described operations performed in pulling the grip shaft 41 away from the camera body 11 are performed in reverse order. Namely, in a state where the pair of rotation lock pins 68a are disengaged from the twelve rotation lock holes 61m, the grip 40 only needs to be rotated to the retracted position shown in FIG. 4 and subsequently be pushed toward the camera body 11 in the direction of the axis X3. In these operations, each of the pair of guide pins 67 moves in the associated rotation permitting groove 61g toward the first stop surface 61g1 thereof, and subsequently moves in the associated rotation preventing groove 61h toward the stop surface 61h1 thereof. The engagement of each guide pin 67 with the first stop surface 61g1 of the associated rotation permitting groove 61g prevents the grip 40 from rotating beyond the retracted position, while the engagement of each guide pin 67 with the stop surface 61h1 of the associated rotation preventing groove 61h prevents the grip 40 from moving in a direction to approach the camera body 11. Accordingly, the grip 40 can be securely brought to the retracted position by moving each guide pin 67 along the associated rotation permitting groove 61g and the associated rotation preventing groove 61h, which also improves the ease of operability of the grip 40 when retracted. Upon the grip 40 being positioned in the retracted position, each of the pair of click balls 65 clicks into the associated front click-ball engaging recess 61d to stop the grip 40 with a click action.

As can be understood from the above description, the present embodiment of the grip shaft mechanism (the grip shaft 41) is constructed to be capable of changing between a locked state in which the outer cylinder 60 and the middle cylinder 61 are prevented from rotating relative to each other, and an unlocked state in which the outer cylinder 60 and the middle cylinder 61 are allowed to rotate relative to each other by operating the rotation-lock release button 72 to move the inner cylinder 62 and the rotation preventing plate 68 in forward and inverse directions along the axis X3, which makes it possible to lock and unlock the grip 40 with reliability so that the grip 40 is either prevented from rotating or allowed to rotate, respectively, even though the present embodiment of the grip shaft mechanism is simple and compact in size.

In addition to the above described rotation locking mechanism that includes the rotation preventing plate 68, the present embodiment of the grip shaft mechanism is provided with a second rotation locking mechanism that allows the grip 40 to rotate only when the grip 40 is pulled away from the camera body 11. The second rotation locking mechanism is composed of the pair of guide pins 67, the pair of rotation preventing grooves 61h and the pair of rotation permitting grooves 61g. For instance, if the rotation-lock release button 72 is pressed with the grip 40 being not yet pulled away from the camera body 11 as shown in FIG. 23, the inner cylinder 62 and the rotation preventing plate 68 move rightward with respect to FIG. 23 so that the pair of rotation lock pins 68a are disengaged from the twelve rotation lock holes 61m. At this time, each guide pin 67 is positioned in close vicinity of the stop surface 61h1 of the associated rotation preventing groove 61h, and the outer cylinder 60 and the middle cylinder 61 are prevented from rotating relative to each other by the engagement of each guide pin 67 with the associated rotation preventing groove 61h (opposed side surfaces therein). The pair of guide pins 67 allow the grip 40 to rotate only when the grip 40 is pulled away from the camera body 11 until the pair of guide pins 67 enter the pair of rotation permitting grooves 61g, respectively, as described above. Therefore, the grip shaft 41 in the above illustrated embodiment of the digital camera does not allow the grip 40 to rotate in the retracted state thereof even if the rotation-lock release button 72 is pressed. This structure makes it possible to prevent an unintentional rotation of the grip 40 from occurring.

The present invention is not limited solely to the particular embodiment described above. For instance, although the outer cylinder 60 that serves as an outside cylindrical element of the grip shaft 41 is fixed to the camera body 11 while the middle cylinder 61 that serves as an inside cylindrical element of the grip shaft 41 is fixed to the grip 40 in the above illustrated embodiment of the grip shaft mechanism, the outside cylindrical element can be fixed to the grip 40 while the inside cylindrical element can be fixed to the camera body 11.

Although the grip 40 is locked and unlocked (prevented from rotating and allowed to rotate) by advancing and retracting the inner cylinder 62, which is positioned inside the middle cylinder 61, along the axis X3 in the above illustrated embodiment of the extendable pivot shaft mechanism, an advancing/returning member which corresponds to the inner cylinder 62 can be provided outside the outer cylinder 60 so that the outer cylinder 60 instead of the middle cylinder 61 can be locked and unlocked by advancing and retracting the advancing/returning member. In this case, elements which correspond to the twelve rotation lock holes 61m are formed on the outer cylinder 60, and the advancing/returning member that is positioned outside the outer cylinder 60 is linearly guided along the axis X3 relative to the middle cylinder 61. However, from the viewpoint of miniaturization of the extendable pivot shaft mechanism, it is desirable that the advancing/returning member which corresponds to the inner cylinder 62 be disposed inside the middle cylinder 61.

Although the rotation-lock release button 72 is positioned to be coaxial with the inner cylinder 62 in the above illustrated embodiment of the extendable pivot shaft mechanism, the position of the unlocking manual operation member on the grip 40 which corresponds to the rotation-lock release button 72 is not limited solely to such a particular-position. For instance, it is possible for the unlocking manual operation member (equivalent to the rotation-lock release button 72 of the present invention) be disposed on the longitudinal side surface 40c or 40d to be movable in a direction parallel to the inner cylinder 62 and that the unlocking manual operation member be coupled to the inner cylinder 62, or it is possible for the unlocking manual operation member be disposed on the camera body 11 so that the inner cylinder 62 can be operated from the camera body 11 side if there is sufficient space for this arrangement. However, from the viewpoint of simplicity of the extendable pivot shaft mechanism and limited installation space, it is desirable for the unlocking manual operation member be a manual operation member like the rotation-lock release button 72 of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An extendable pivot shaft mechanism of a camera for pivoting a rotatable grip on a camera body to allow said rotatable grip both to rotate about a rotational axis and to move along said rotational axis relative to said camera body, said extendable pivot shaft mechanism comprising:

first and second cylindrical members which are concentrically arranged and are fixed to said camera body and to said rotatable grip, respectively;

an advancing/retreating lock control member which is supported by said first cylindrical member to be linearly movable along said rotational axis without rotating relative thereto, wherein said advancing/retreating lock control member is operated from outside one of said camera body and said grip;

a rotation locking mechanism for changing a state of said advancing/retreating lock control member and said second cylindrical member between a rotation locked state, in which said advancing/retreating lock control member and said second cylindrical member are prevented from rotating relative to each other, and a rotation unlocked state, in which said advancing/retreating lock control member and said second cylindrical members are allowed to rotate relative to each other, in accordance with a linear movement of said advancing/retreating lock control member relative to said first cylindrical member; and a lock biasing device for biasing said advancing/retreating lock control member in a rotation locking direction to cause said rotation locking mechanism to change to said rotation locked state.

2. The extendable pivot shaft mechanism according to claim 1, wherein said first and second cylindrical members comprise:

an outside cylinder fixed to said camera body; and an inside cylinder fixed to said rotatable grip and positioned inside said outside cylinder, wherein said advancing/retreating lock control member is positioned inside said inside cylinder to be supported thereby.

3. The extendable pivot shaft mechanism according to claim 2, wherein said advancing/retreating lock control member is supported so as to linearly move along said rotational axis without rotating relative to said outside cylinder and so as to both linearly move along said rotational axis and rotate relative to said inside cylinder.

4. The extendable pivot shaft mechanism according to claim 3, wherein said rotation locking mechanism comprises:
- a rotation preventing plate which faces an end surface of said inside cylinder and moves linearly along said rotational axis together with said advancing/retreating lock control member to move toward and away from said end surface of said inside cylinder; and
- at least one projection and at least one recess which are provided on an end surface of said rotation preventing plate and said end surface of said inside cylinder, respectively, which are opposed to each other in said rotational axis direction to be engageable with each other, said projection being engaged in said recess when said end surfaces of said rotation preventing plate and said inside cylinder move close to each other to prevent said rotation preventing plate and said inside cylinder from rotating relative to each other, and said projection being disengaged from said recess when said end surfaces of said rotation preventing plate and said inside cylinder move away from each other to allow said rotation preventing plate and said inside cylinder to rotate relative to each other.

5. The extendable pivot shaft mechanism according to claim 4, wherein said recess comprises a plurality of recesses formed on said end surface of said inside cylinder in a circumferential direction about said rotational axis.

6. The extendable pivot shaft mechanism according to claim 5, wherein said plurality of recesses are provided at substantially equi-angular intervals about said rotational axis.

7. The extendable pivot shaft mechanism according to claim 4, wherein said outside cylinder comprises at least one linear guide groove formed on an inner peripheral surface of said outside cylinder so as to extend in a direction parallel to said rotational axis, and
- wherein said rotation preventing plate comprises at least one linear guide projection which is slidably engaged in said linear guide groove.

8. The extendable pivot shaft mechanism according to claim 7, wherein said linear guide groove comprises a pair of linear guide grooves which are radially opposed to each other, and
- wherein said linear guide projection comprises a pair of linear guide projections which are slidably engaged in said pair of linear guide grooves, respectively.

9. The extendable pivot shaft mechanism according to claim 4, wherein said rotation preventing plate is coupled to said advancing/retreating lock control member to be prevented from rotating about said rotational axis relative to said advancing/retreating lock control member.

10. The extendable pivot shaft mechanism according to claim 4, wherein said lock biasing device biases said rotation preventing plate in a direction to move said end surface of said rotation preventing plate toward said end surface of said inside cylinder.

11. The extendable pivot shaft mechanism according to claim 10, wherein said lock biasing device comprises a coil spring positioned in an annular space between said inside cylinder and said advancing/retreating lock control member, and
- wherein said inside cylinder and said advancing/retreating lock control member include a first spring contacting portion and a second contacting portion with which one and the other end of said coil spring are in pressing contact, respectively.

12. The extendable pivot shaft mechanism according to claim 1, further comprising an unlocking manual operation member which is positioned in a through-hole, formed on an external wall of said grip to extend therethrough, to be movable along an axis of said through-hole,
- wherein said unlocking manual operation member pushes said advancing/retreating lock control member in a rotation unlocking direction opposed to said rotation locking direction against the biasing force of said lock biasing device to cause said rotation locking mechanism to change to said rotation unlocked state when said unlocking manual operation member is operated.

13. The extendable pivot shaft mechanism according to claim 12, wherein said unlocking manual operation member is pressed into said grip when said unlocking manual operation member is operated.

14. The extendable pivot shaft mechanism according to claim 12, wherein said unlocking manual operation member is coaxial with said advancing/retreating lock control member.

15. The extendable pivot shaft mechanism according to claim 1, further comprising a second rotation locking mechanism for preventing said first and second cylindrical members from rotating relative to each other independently of said rotation locking mechanism when said grip is in a first position close to said camera body in said rotation axis direction, and for allowing said first and second cylindrical members to rotate relative to each other when said grip is in a second position jutted from said camera body in said rotation axis direction.

16. The extendable pivot shaft mechanism according to claim 15, wherein said second rotation locking mechanism comprises:
- at least one axial groove formed on one of radially opposed peripheral surfaces of said first and second cylindrical members to extend in a direction substantially parallel to said rotational axis;
- at least one circumferential groove formed on said one of radially opposed peripheral surfaces of said first and second cylindrical members to be communicatively connected with said axial groove; and
- at least one guide projection which projects from the other of said radially opposed peripheral surfaces of said first and second cylindrical members to be slidably selectively engaged in said axial groove and said circumferential groove.

17. The extendable pivot shaft mechanism according to claim 16, wherein said circumferential groove comprises a stop surface which limits a range of movement of said guide projection to limit a range of rotation of said grip relative to said camera body.

18. The extendable pivot shaft mechanism according to claim 17, wherein said circumferential groove is communicatively connected with one end of said axial groove in said rotational axis direction, and
- wherein said stop surface is formed on said one end of said axial groove.

19. The extendable pivot shaft mechanism according to claim 1, further comprising a click-stop mechanism, provided between radially opposed peripheral surfaces of said first and second cylindrical members, for selectively stopping said grip moving along said rotational axis at a first position close to said camera body and a second position away from said camera body with a click action, and for selectively stopping said grip rotating about said rotational axis at different rotational positions relative to said camera body with a click action.

20. The extendable pivot shaft mechanism according to claim 1, wherein said advancing/retreating lock control member is positioned radially inside said first and second cylindrical members to be concentric with said first and second cylindrical members.

21. The extendable pivot shaft mechanism according to claim 1, wherein said rotatable grip comprises a shutter release button.

22. The extendable pivot shaft mechanism according to claim 1, wherein said rotational axis extends in a direction orthogonal to an optical axis of a photographing optical system of said camera.

23. An extendable pivot shaft mechanism for connecting two devices with each other to allow said two devices both to rotate relative to each other about a rotational axis and to move relative to each other along said rotational axis, said extendable pivot shaft mechanism-comprising:

first and second cylindrical members which are concentrically arranged and are fixed to said two devices, respectively;

an advancing/retreating lock control member which is supported by said first cylindrical member to be linearly movable along said rotational axis without rotating relative thereto, wherein said advancing/retreating lock control member is operated from outside one of said two devices;

a rotation locking mechanism for changing a state of said advancing/retreating lock control member and said second cylindrical member between a rotation locked state, in which said advancing/retreating lock control member and said second cylindrical member are prevented from rotating relative to each other, and a rotation unlocked state, in which said advancing/retreating lock control member and said second cylindrical member are allowed to rotate relative to each other, in accordance with a linear movement of said advancing/retreating lock control member relative to said first cylindrical member; and a lock biasing device for biasing said advancing/retreating lock control member in a rotation locking direction to cause said rotation locking mechanism to change to said rotation locked state.

* * * * *